(12) United States Patent
Teramoto et al.

(10) Patent No.: US 8,185,474 B2
(45) Date of Patent: May 22, 2012

(54) IMAGE PROCESSING APPARATUS, IMAGE OUTPUTTING METHOD, AND IMAGE OUTPUTTING PROGRAM EMBODIED ON COMPUTER READABLE MEDIUM

(75) Inventors: Keisuke Teramoto, Itami (JP); Yoichi Kawabuchi, Itami (JP); Junichi Hase, Osaka (JP); Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 407 days.

(21) Appl. No.: 12/468,378

(22) Filed: May 19, 2009

(65) Prior Publication Data

US 2009/0289944 A1    Nov. 26, 2009

(30) Foreign Application Priority Data

May 20, 2008   (JP) ................................ 2008-132406

(51) Int. Cl.
*G06F 21/00*   (2006.01)
(52) U.S. Cl. .......................................... 705/54; 726/27
(58) Field of Classification Search .............. 358/1–305, 358/906; 726/27; 705/54
See application file for complete search history.

(56) References Cited

U.S. PATENT DOCUMENTS

| | | | | |
|---|---|---|---|---|
| 6,947,571 B1* | 9/2005 | Rhoads et al. | ................. | 382/100 |
| 2003/0142872 A1* | 7/2003 | Koyanagi | ..................... | 382/236 |
| 2004/0001214 A1* | 1/2004 | Monroe | ....................... | 358/1.13 |
| 2005/0163549 A1* | 7/2005 | Shima et al. | .................... | 400/62 |
| 2005/0166057 A1* | 7/2005 | Kanai et al. | ................... | 713/176 |
| 2005/0180510 A1* | 8/2005 | Togita | ....................... | 375/240.26 |
| 2005/0200890 A1* | 9/2005 | Gassho et al. | ................ | 358/1.15 |
| 2006/0036864 A1* | 2/2006 | Parulski et al. | ............... | 713/176 |
| 2006/0112413 A1* | 5/2006 | Ando et al. | .................... | 725/105 |
| 2006/0187317 A1* | 8/2006 | Montulli et al. | ........... | 348/231.5 |
| 2006/0242418 A1* | 10/2006 | Willamowski et al. | ....... | 713/176 |
| 2007/0064947 A1* | 3/2007 | King et al. | ..................... | 380/270 |
| 2007/0127773 A1* | 6/2007 | Ogawa | .......................... | 382/103 |
| 2007/0174632 A1* | 7/2007 | Ferren et al. | ................. | 713/186 |
| 2007/0188594 A1 | 8/2007 | Yoshino | | |
| 2007/0200939 A1* | 8/2007 | Matsuyama | ............... | 348/240.1 |
| 2007/0204307 A1* | 8/2007 | Lee et al. | ........................ | 725/73 |

(Continued)

FOREIGN PATENT DOCUMENTS

JP     2002-281478     9/2002

(Continued)

OTHER PUBLICATIONS

"Multifunction printer", Wikipedia.com, all pages, Mar. 5, 2008. http://web.archive.org/web/20080305092108/http://en.wikipedia.org/wiki/Multifunction_printer.*

(Continued)

*Primary Examiner* — James A Reagan
*Assistant Examiner* — Calvin Cheung
(74) *Attorney, Agent, or Firm* — Buchanan Ingersoll & Rooney PC

(57) ABSTRACT

In order to enable a still image to be checked while preventing leakage of confidential information contained in the still image, an MFP includes: an image acquiring portion to acquire a still image; an encoding portion to generate encoded data by encoding the acquired still image using an encoding key stored in advance; a decoding portion to decode the encoded data using the encoding key or a decoding key corresponding to the encoding key; and a transmitting portion to externally output the decoded still image in an electronically non-recordable form.

10 Claims, 12 Drawing Sheets

U.S. PATENT DOCUMENTS

| | | | |
|---|---|---|---|
| 2007/0229516 A1 | 10/2007 | Sugimoto | |
| 2007/0260985 A1* | 11/2007 | Utagawa et al. | 715/721 |
| 2007/0300074 A1* | 12/2007 | Natter | 713/182 |
| 2008/0033721 A1* | 2/2008 | Dittrich | 704/235 |
| 2008/0144890 A1* | 6/2008 | Ogawa | 382/118 |
| 2008/0275881 A1* | 11/2008 | Conn et al. | 707/10 |
| 2008/0285797 A1* | 11/2008 | Hammadou | 382/103 |
| 2008/0305829 A1* | 12/2008 | Monroe | 455/556.1 |
| 2009/0048692 A1* | 2/2009 | Levien et al. | 700/94 |
| 2009/0049502 A1* | 2/2009 | Levien et al. | 725/136 |
| 2009/0094518 A1* | 4/2009 | Lawther et al. | 715/716 |
| 2010/0220978 A1* | 9/2010 | Ogikubo | 386/95 |

FOREIGN PATENT DOCUMENTS

| | | |
|---|---|---|
| JP | 2003-264816 | 9/2003 |
| JP | 2007-166387 A | 6/2007 |
| JP | 2007-208458 | 8/2007 |
| JP | 2007-208459 | 8/2007 |
| JP | 2007-214873 | 8/2007 |
| JP | 2007-251422 | 9/2007 |

OTHER PUBLICATIONS

Notice of Ground of Rejection issued in the corresponding Japanese Patent Application No. 2008-132406 dated Jun. 1, 2010, and an English Translation thereof.

Office Action (Decision of Rejection) dated Feb. 1, 2011, issued in the corresponding Japanese Patent Application No. 2008-132406, and an English Translation thereof.

* cited by examiner

F I G. 4
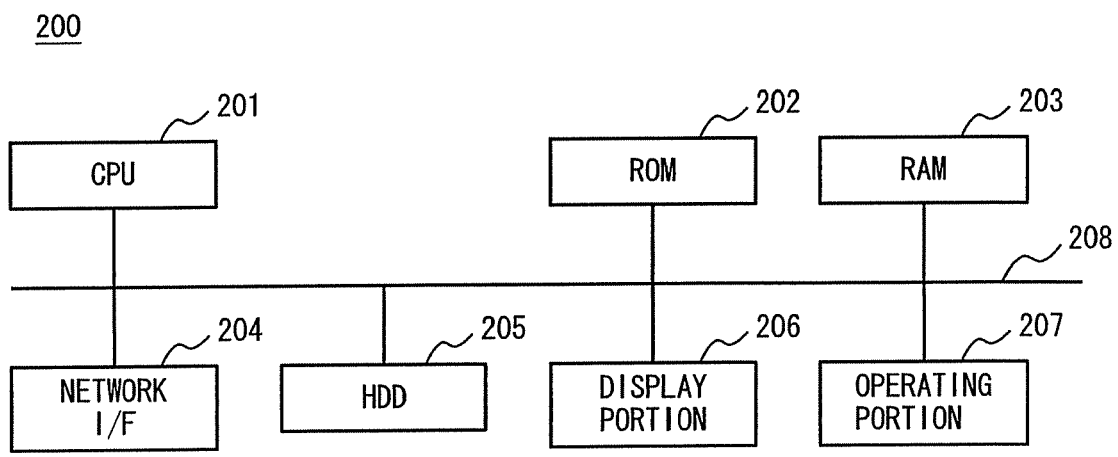

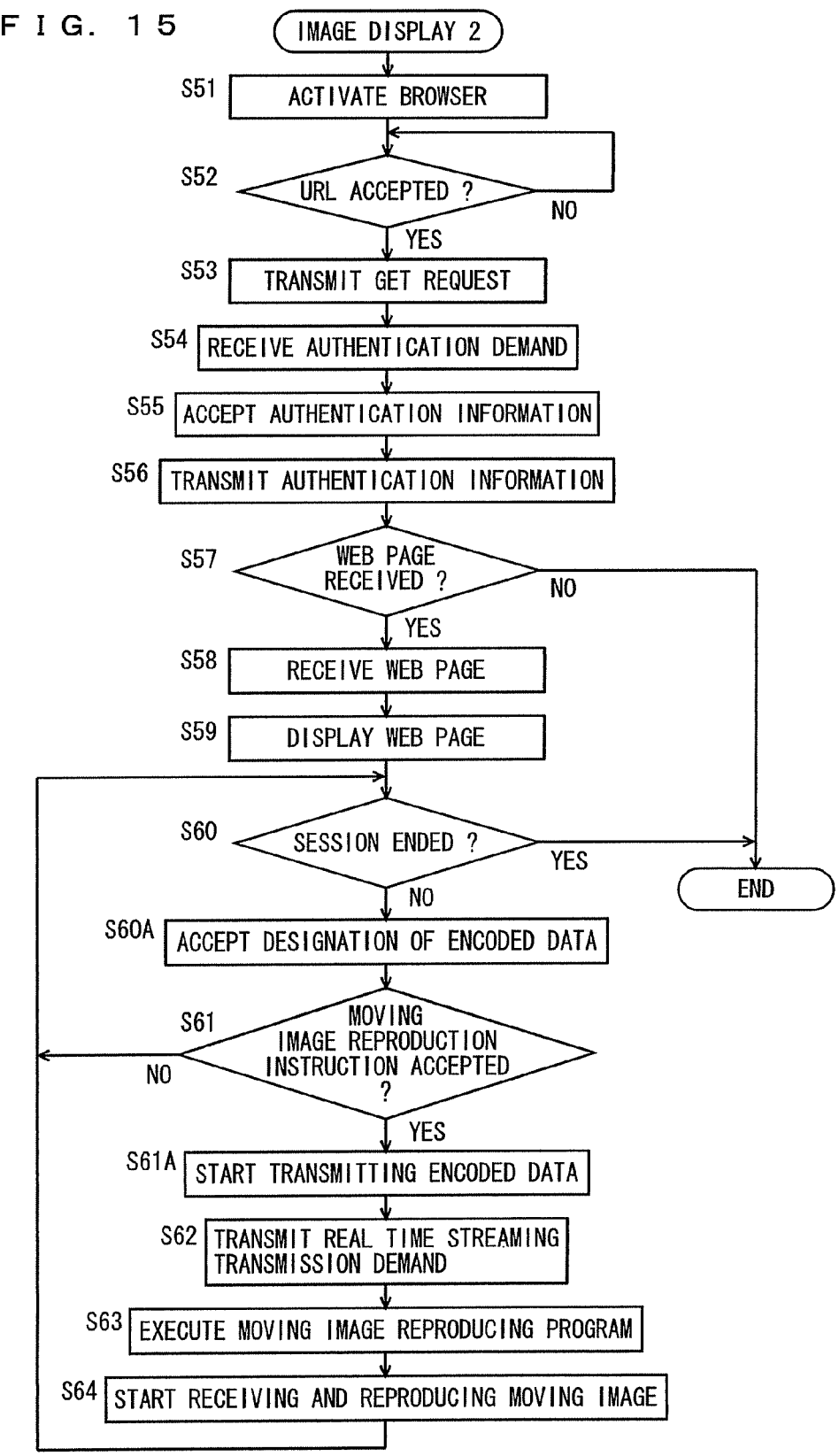

IMAGE PROCESSING APPARATUS, IMAGE OUTPUTTING METHOD, AND IMAGE OUTPUTTING PROGRAM EMBODIED ON COMPUTER READABLE MEDIUM

This application is based on Japanese Patent Application No. 2008-132406 filed with Japan Patent Office on May 20, 2008, the entire content of which is hereby incorporated by reference.

BACKGROUND OF THE INVENTION

1. Field of the Invention

The present invention relates to an image processing apparatus, an image outputting method, and an image outputting program, and more particularly to an image processing apparatus, an image outputting method, and an image outputting program that are suitable for outputting an image containing confidential information.

2. Description of the Related Art

In recent years, multi-function peripherals (hereinafter referred to as MFPs) have mounted therein mass storage such as hard disc drives (HDDs) and thus have been able to store a large quantity of data. When containing confidential information, the stored data must be prevented from leaking. For example, copies of the data can be generated outside the MFP when the data is stored in a storing medium detachable to and from the MFP, such as a semiconductor memory, or when an MFP is connected to a local area network (LAN), in which case the data stored in the HDD can be transferred to a personal computer (hereinafter referred to as a PC) connected to the LAN. This disables confidentiality.

Japanese Laid-Open Publication No. 2007-166387 describes: a printing data file generating device having a function to generate, on a storing medium such as a USB memory, a file of printing data (that cannot be printed on usual printing apparatuses) containing sign data encoded with the use of a preset sign generating key; and a printing device that judges whether the file may be printed by decoding the sign data in the file on the storing medium with the use of a sign verifying key that is preset in the device.

The encoding of the printing data during storage keeps it confidential, but the printing data cannot be decoded outside the printing device, posing problems including inability to check the printing data before printing it on the printing device.

SUMMARY OF THE INVENTION

The present invention is made to solve the aforementioned problems. An object of the present invention is to provide an image processing apparatus capable of making a still image checked while preventing leakage of confidential information contained in the still image.

Another object of the present invention is to provide an image outputting method capable of making a still image checked while preventing leakage of confidential information contained in the still image.

Another object of the present invention is to provide an image outputting program capable of making a still image checked while preventing leakage of confidential information contained in the still image.

In order to achieve the aforementioned objects, an image processing apparatus according to an aspect of the present invention includes: an image acquiring portion to acquire a still image; an encoding portion to generate encoded data by encoding the acquired still image using an encoding key stored in advance; a decoding portion to decode the encoded data using the encoding key or a decoding key corresponding to the encoding key; and an outputting portion to externally output the decoded still image in an electronically non-recordable form.

According to another aspect of the present invention, an image outputting method includes: acquiring a still image; generating encoded data by encoding the acquired still image using an encoding key stored in advance; decoding the encoded data using the encoding key or a decoding key stored in advance to correspond to the encoding key; and externally outputting the decoded still image in an electronically non-recordable form.

According to another aspect of the present invention, an image outputting program embodied on a computer readable medium causes a computer to execute processing including: acquiring a still image; generating encoded data by encoding the acquired still image using an encoding key stored in advance; decoding the encoded data using the encoding key or a decoding key stored in advance to correspond to the encoding key; and externally outputting the decoded still image in an electronically non-recordable form.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a block diagram showing an example of the hardware structure of a PC.

FIG. 15 is a flowchart showing an example of the flow of image displaying processing according to the modified embodiment.

DESCRIPTION OF THE PREFERRED EMBODIMENTS

Figure 1:
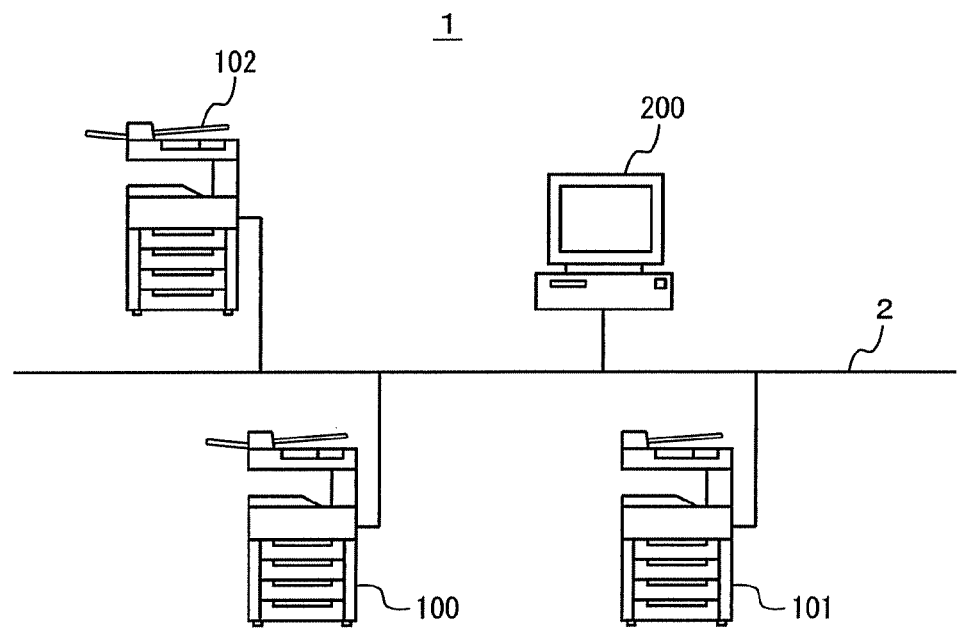
FIG. 1 is a schematic diagram of an image outputting system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

FIG. 1 is a schematic diagram of an image outputting system according to an embodiment of the present invention. Referring to FIG. 1, an image outputting system 1 includes MFPs 100, 101, and 102 serving as image processing apparatuses, and a personal computer (hereinafter referred to as a PC) 200, all of which are connected to a network 2.

Network 2 is a local area network (LAN) and connected to the Internet through a gateway. The form of connection of network 2 can be either wire or radio. In addition, network 2 is not limited to LAN but can be a network using a public switched telephone network, a wide area network (WAN), or the Internet.

PC 200 is a usual computer and installs a browsing program for downloading Web pages stored in a Web server and a moving image reproducing program for reproducing moving images by decoding moving image data.

MFPs 100, 101, and 102 each include a scanner for reading a document, and an image forming device and a facsimile device for forming an image onto a recording medium such as a sheet of paper based on image data, so that the MFPs each have an image reading function, a copying function, and a facsimile transmitting/receiving function. Also MFPs 100, 101, and 102 each install a program to cause it to function as a Web server and a streaming transmission server. While MFPs 100, 101, and 102 are exemplified in this embodiment, some other apparatuses capable of recording still images may be used such as printers, facsimiles, and personal computers, instead of MFPs 100, 101, and 102. MFPs 100, 101, and 102 have the same functions, and MFP 100 will be taken as an example here unless stated otherwise.

Figure 2:
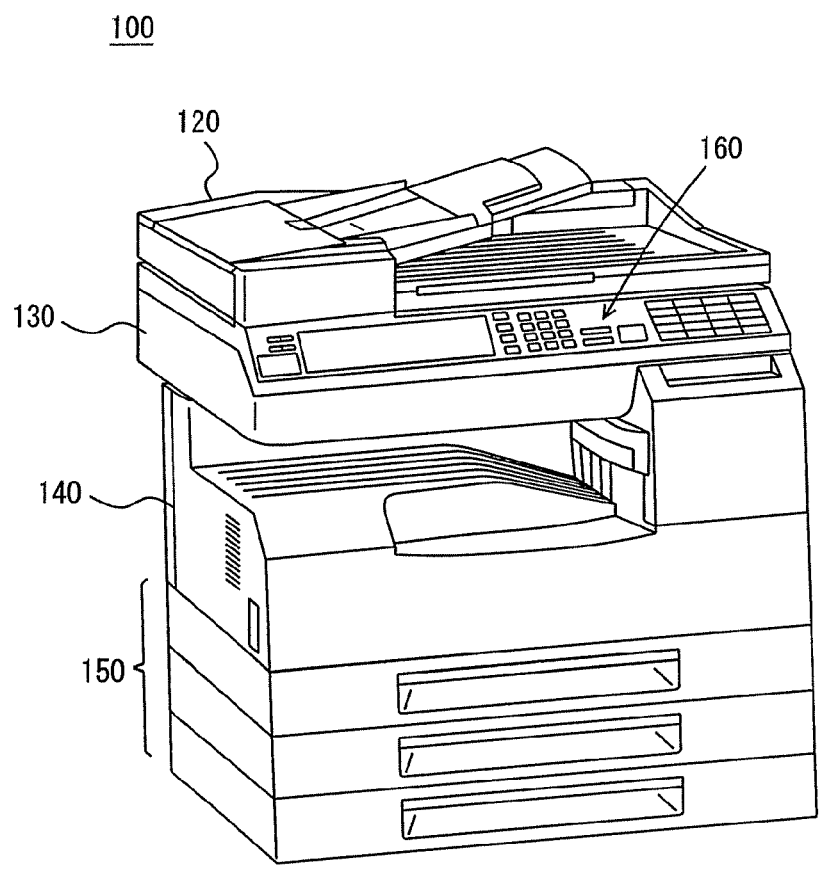
FIG. 2 is a perspective view of an MFP.
Figure 3:
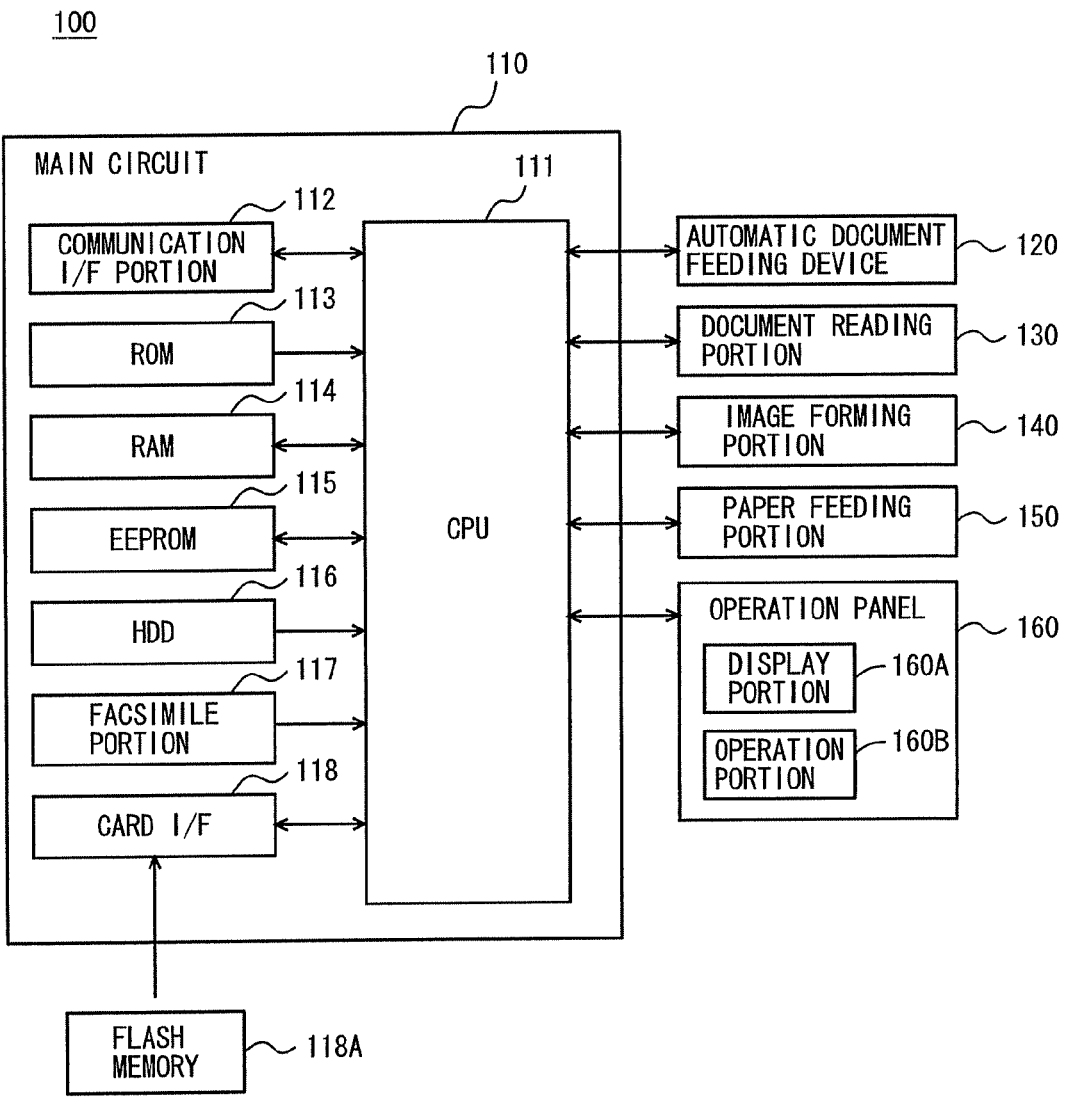
FIG. 3 is a block diagram showing an example of the hardware structure of the MFP.

FIG. 2 is a perspective view of the MFP. FIG. 3 is a block diagram showing an example of the hardware structure of the MFP. Referring to FIGS. 2 and 3, MFP 100 includes a main circuit 110, a document reading portion 130 to read a document, an automatic document feeding device 120 to feed a document to document reading portion 130, an image forming portion 140 to form a still image onto a medium such as a sheet of paper when the still image read from the document is output from document reading portion 130, a paper feeding portion 150 to supply sheets to image forming portion 140, and an operation panel 160 serving as a user interface. Main circuit 110 includes a CPU 111, a communication interface (I/F) portion 112, a ROM 113, a RAM 114, an EEROM (Electronically Erasable and Programmable ROM) 115, a hard disk drive (HDD) 116 serving as a mass storage, a facsimile portion 117, and a card interface (I/F) 118 to which a flash memory 118A is mounted. CPU 111 is connected to automatic document feeding device 120, document reading portion 130, image forming portion 140, paper feeding portion 150, and operation panel 160, in order to generally control MFP 100.

ROM 113 stores a program executed by CPU 111 or data necessary for execution of the program. RAM 114 is used as a working area for CPU 111 to execute the program. Also RAM 114 temporarily stores still images continually transmitted from document reading portion 130.

Operation panel 160 is provided on top of MFP 100 and includes a display portion 160A and an operation portion 160B. Display portion 160A is a display device such as a liquid crystal display (LCD) and an organic ELD (Electroluminescence Display), and displays, for example, an instruction menu for users and information about image data that is obtained. Operation portion 160B has a plurality of keys and accepts input of data including various instructions, characters, and numbers corresponding to the keys input by the user's operations. Also operation portion 160B includes a touch panel provided over display portion 160A.

Communication I/F portion 112 is an interface for connecting MFP 100 to network 2. CPU 111 communicates with MFP 101, MFP 102, or PC 200 through communication I/F portion 112 to exchange data. Also communication I/F portion 112 is communicable with computers connected to the Internet through network 2.

Facsimile portion 117 is connected to a public switched telephone network (PSTN) to transmit facsimile data to the PSTN or receive facsimile data from the PSTN. Facsimile portion 117 stores the received facsimile data in HDD 116 or outputs the received facsimile data to image forming portion 140. Image forming portion 140 prints the facsimile data received by facsimile portion 117 onto a sheet of paper. Facsimile portion 117 also converts output data read from a document by document reading portion 130 or data stored in HDD 116 into facsimile data, and transmits the facsimile data to the facsimile device connected to the PSTN.

To card I/F 118, flash memory 118A is mounted. CPU 111 has access to flash memory 118A through card I/F 118. CPU 111 loads into RAM 114 a program recorded in flash memory 118A mounted in card I/F 118 and executes the program. The program executed by CPU 111 is not limited to one recorded in flash memory 118A but may also be those recorded in a flexible disk, a cassette tape, an optical disk (CD-ROM (Compact Disc-ROM)/MO (Magnetic Optical Disc)/MD (Mini Disc)/DVD (Digital Versatile Disc)), an IC card, an optical card, and a semiconductor memory such as a masked ROM, an EPROM (Erasable Programmable ROM), an EEPROM (Electronically EPROM), and the like. It is also possible to execute a program stored in HDD 116 by loading the program into RAM 114. In this case, another computer connected to network 2 may rewrite the program stored in HDD 116 of MFP 100 or add and write a new program. It is also possible that MFP 100 downloads a program from another computer connected to network 2 and stores the program in HDD 116. The program, as used herein, not only includes a program directly executable by CPU 111, but also a source program, a compressed program, an encoded program, and the like.

FIG. 4 is a block diagram showing an example of the hardware structure of the PC. Referring to FIG. 4, PC 200 includes a CPU 201 to generally control PC 200, a ROM 202 that stores a program or the like to be executed at CPU 201, a RAM 203 used as a working area for CPU 201, a network I/F 204 to connect PC 200 to a network, an HDD 205 serving as a mass storage, a display portion 206, and an operation portion 207 to accept input of operations from users, all of which are connected to a bus 208.

Figure 5:
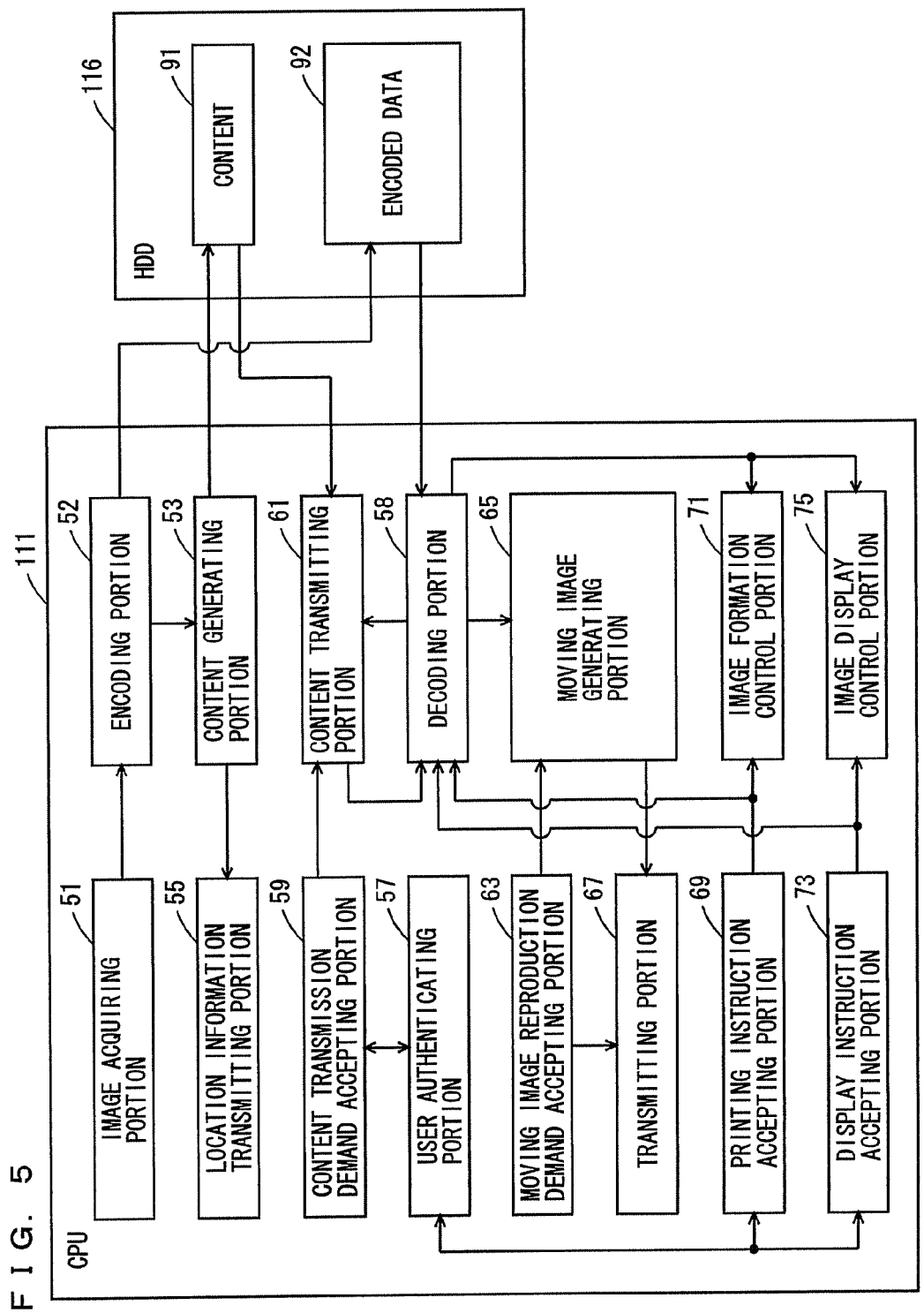
FIG. 5 is a functional block diagram showing an example of the functions of the CPU of the MFP together with data stored in the HDD.

FIG. 5 is a functional block diagram showing an example of the functions of the CPU of the MFP together with data to be stored in the HDD. Referring to FIG. 5, CPU 111 of MFP 100 includes an image acquiring portion 51 to acquire a still image, an encoding portion 52 to generate encoded data by encoding the still image, a content generating portion 53 to generate a content including a Web page, a location information transmitting portion 55 to transmit location information of the Web page on network 2, a content transmission demand accepting portion 59 to accept a transmission demand of a content, a user authenticating portion 57 to authenticate a user, a decoding portion 58 to decode the encoded data, a content transmitting portion 61 to transmit the Web page, a moving image reproduction demand accepting portion 63 to accept a moving image reproduction demand, a moving image generating portion 65 to generate a moving image from the still image, a transmitting portion 67 to transmit the moving image, a printing instruction accepting portion 69 to accept a printing instruction, an image formation control portion 71 to form the still image onto a sheet, a display instruction accepting portion 73 to accept a display instruction, and an image display control portion 75 to display the still image on display portion 160A.

Image acquiring portion 51 acquires a still image and outputs the acquired still image to encoding portion 52. Specifically, when a user inputs to operation portion 160B a document reading instruction to read a document image, then image acquiring portion 51 accepts input of the document reading instruction from operation portion 160B. Upon accepting input of the document reading instruction, image acquiring portion 51 causes document reading portion 130 to read the document image, acquires from document reading portion 130 a still image read from the document image and output from document reading portion 130, and outputs the still image to encoding portion 52. When document reading portion 130 reads a plurality of number of documents, image acquiring portion 51 acquires a plurality of still images.

Image acquiring portion 51 also displays on display portion 160A file names of still images stored in HDD 116. When the user inputs to operation portion 160B an operation to select a displayed file name, image acquiring portion 51 acquires from HDD 116 a still image with the file name selected through operation portion 160B and outputs the still image to encoding portion 52.

When communication I/F portion 112 receives printing data from a PC connected to network 2, image acquiring portion 51 acquires from communication I/F portion 112 the printing data that communication I/F portion 112 receives from the PC. Image acquiring portion 51 converts the printing data acquired from communication I/F portion 112 into a still image and outputs the still image to encoding portion 52.

When communication I/F portion 112 receives a still image from PC 200, which is connected to network 2, according to a communication protocol such as FTP (File Transfer Protocol) and SMB (Server Message Block), then image acquiring portion 51 outputs the still image that communication I/F portion 112 receives from the PC to encoding portion 52.

Encoding portion 52 encodes the still image input from image acquiring portion 51 using an encoding key stored in advance. The encoding key may be a key stored only in MFP 100; for example, MFP 100 may automatically issue the key. Encoding portion 52 carries out encoding according to an encoding system that enables decoding on a still image basis. For example, a stream encoding system may be used. Encoding portion 52 then stores encoded data resulting from encoding the still image in HDD 116. This causes encoded data 92 to be stored in HDD 116. Upon generation of encoded data 92, encoding portion 52 outputs identification information of encoded data 92 to content generating portion 53.

When encoding portion 52 generates the encoded data, content generating portion 53 generates a content and stores the generated content in HDD 116. The content encompasses a still image content and a moving image content containing a command to reproduce a moving image, described later. To describe a specific example of the foregoing, the still image content may be a still image Web page containing a link to a still image. At the time when content generating portion 53 generates a still image Web page, the still image is stored in HDD 116 as encoded data 92. Content generating portion 53 then generates a still image Web page containing an area for a link to the still image and stores the still image Web page and encoded data 92 in HDD 116 while associating them with one another.

The moving image content contains a moving image Web page and a meta file. The meta file is described in a markup language and contains a command to transmit the moving image in a real time manner. The command contained in the meta file contains location information of a moving image file, described later, on network 2. The command is a command for communication according to a communication protocol such as RTSP (Real Time Streaming Protocol) and MMS (Microsoft Media Server). The location information contains an IP address allotted to MFP 100 and an absolute path to the meta file in HDD 116, where the meta file is stored. The location information refers to location information of the moving image file on the network and uses URL (Uniform Resource Locator) in this example. Content generating portion 53 stores the generated meta file in HDD 116.

Next, content generating portion 53 generates a Web page and stores the Web page in HDD 116. The Web page contains the location information (URL) of the meta file on network 2. Thus, when the Web page is displayed on PC 200, which installs a browser program, then PC 200 is able to download the meta file from MFP 100 based on the URL of the meta file. Processing in the case where PC 200 downloads the meta file will be specified later.

Location information transmitting portion 55 transmits URLs generated by content generating portion 53 for the still image Web page and the moving image Web page. The transmission destination of the URLs may be predetermined or acquired together with the still image when image acquiring portion 51 acquires the still image. For example, when the user inputs to operation portion 160B a document reading instruction to read a document image, location information transmitting portion 55 authenticates the user and then either acquires transmission destination information allotted in advance to the authenticated user or accepts from operation portion 160B transmission destination information that the user inputs to operation portion 160B. When communication I/F portion 112 receives printing data or a still image from PC 200 connected to network 2, location information transmitting portion 55 acquires from communication I/F portion 112 transmission destination information that is received together with the printing data or still image. In this example, location information transmitting portion 55 generates a URL-containing electronic mail addressed to an electronic mail address specified by the transmission destination information and transmits the generated electronic mail to an electronic mail server. The following description exemplifies the case where a user who is allotted an electronic mail address operates PC 200 to receive an electronic mail. While in this example an electronic mail containing a URL is transmitted, transmission by other communication methods such as FTP is also possible.

When an electronic mail transmitted from MFP 100 is received and displayed at PC 200, the URLs of the still image Web page and the moving image Web page are displayed. When the user operating PC 200 makes an instruction for the URL of the still image Web page, PC 200 executes a browsing program and transmits in return a content transmission demand to demand transmission of the still image Web page to MFP 100. In this example, the content transmission demand is a GET command and contains the URL of the still image Web page. When the user operating PC 200 makes an instruction for the URL of the moving image Web page, PC 200 executes a browsing program and transmits in return a content transmission demand to demand transmission of the moving image Web page to MFP 100. The content transmission demand is a GET command and contains the URL of the moving image Web page.

MFP 100 serves as a Web server. When communication I/F portion 112 receives a content transmission demand, content transmission demand accepting portion 59 accepts from communication I/F portion 112 the content transmission demand and an IP (Internet Protocol) address of PC 200, which has transmitted the command. Content transmission demand accepting portion 59 first outputs the IP address of PC 200 to user authenticating portion 57 and then outputs, on condition that an authentication by user authenticating portion 57 is successful, the content transmission demand and the IP address of PC 200 to content transmitting portion 61.

User authenticating portion 57 transmits an authentication Web page to demand log-in to PC 200 based on the IP address input from content transmission demand accepting portion 59. The authentication Web page has an area for inputting a password as authentication information and contains a command to transmit to MFP 100 the password input to the area. When the user of PC 200 inputs the password to operation portion 207 of PC 200, PC 200 transmits the password to MFP 100 through network I/F 204. Since the password transmitted from PC 200 is received by communication I/F portion 112 of MFP 100, user authenticating portion 57 accepts the password from communication I/F portion 112. When the accepted password agrees to a predetermined password, user authenticating portion 57 judges this case as a successful authentication, while when they do not agree, user authenticating portion 57 judges this case as a failed authentication. When judging for a successful authentication, user authenticating portion 57 outputs a signal indicating a successful authentication to content transmission demand accepting portion 59. Also when the authentication is successful, user authenticating portion 57 establishes a communication session with PC 200. The session is maintained until receipt of an instruction for severance of the session from PC 200.

It is possible to store the predetermined password in HDD 116 while making the password correspond to the user, so that a demand can be made to a different password on a user basis. This improves the security of the still image. It is also possible to store the password while making it correspond to a Web page stored in HDD 116. For example, it is possible to accept the password at the time when image acquiring portion 51 acquires the still image and to store the password while making it correspond to a Web page generated by content generating portion 53. In this case, only the user who has made the operation to input the still image to MFP 100 is able to know the password. It is also possible to generate a password when location information transmitting portion 55 transmits the URL of a Web page; store the password while making it correspond to the Web page; and transmit the password together with the URL of the Web page. In this case, a person who receives the electronic mail is able to know the password.

When storing the password while making it correspond to a Web page stored in HDD 116, user authenticating portion 57 accepts a URL together with an IP address from content transmission demand accepting portion 59, and compares the password accepted from communication I/F portion 112 with the password stored while being made to correspond to a Web page specified by the accepted URL.

Upon accepting input of a URL of a moving image Web page and an IP address from content transmission demand accepting portion 59, content transmitting portion 61 reads from HDD 116 a moving image Web page specified by the URL and transmits the moving image Web page to PC 200 based on the IP address through communication I/F portion 112. Content transmitting portion 61 outputs to decoding portion 58 a decoding instruction containing identification information stored while being made to correspond to the moving image Web page. Upon accepting input of the decoding instruction from content transmitting portion 61, decoding portion 58 reads from HDD 116 encoded data 92 specified by the identification information contained in the decoding instruction and decodes the encoded data. When encoding portion 52 carries out encoding according to a common key system, decoding portion 58 decodes the encoded data using the encoding key used for the encoding, while when encoding portion 52 carries out encoding according to a public key system, decoding portion 58 decodes the encoded data using a secret key that corresponds to the encoding key (public key) used for the encoding. Then decoding portion 58 outputs the decoded still image to moving image generating portion 65.

Upon accepting input of a URL of a still image Web page and an IP address from content transmission demand accepting portion 59, content transmitting portion 61 outputs to decoding portion 58 a decoding instruction containing identification information stored while being made to correspond to a still image Web page specified from HDD 116 by the URL, and turns into a stand-by state until accepting input of the still image from decoding portion 58. Upon accepting input of the decoding instruction from content transmitting portion 61, decoding portion 58 reads from HDD 116 encoded data 92 specified by the identification information contained in the decoding instruction and decodes the encoded data. Then decoding portion 58 outputs the decoded still image to content transmitting portion 61.

Upon accepting input of the still image from decoding portion 58, content transmitting portion 61 sets the still image at modes that prohibit copying, storage, and printing of the still image. In this case, a password is preferably set in order to keep the modes unchanged. Then content transmitting portion 61 reads the still image Web page specified by the URL input from content transmission demand accepting portion 59; links the still image to an area of the still image Web page secured for the still image; and, based on the IP address, transmits to PC 200 through communication I/F portion 112 the still image and the still image Web page to which the still image is linked. The still image Web page is set at a mode that prohibits acceptance of external operations. As an example, the command "< body oncontextmenu='return false' >" is added to the header. This prevents right-click operations from being accepted, thus disabling the operation to store the still image.

PC 200, which receives a still image Web page or a moving image Web page, executes a browser program and displays the still image Web page or the moving image Web page on display portion 206. Since the still image Web page is linked to the still image, the still image is displayed on the Web page. Also, since the still image Web page is set at a mode that prohibits acceptance of external operations, operations including storing the still image are prohibited. Further, there is an application program executed to display the still image, but the program cannot copy, store, and print the still image since the still image is set at modes that prohibit copying, storage, and printing. In addition, the modes are protected with a password, which prevents the modes from being released.

Figure 6:
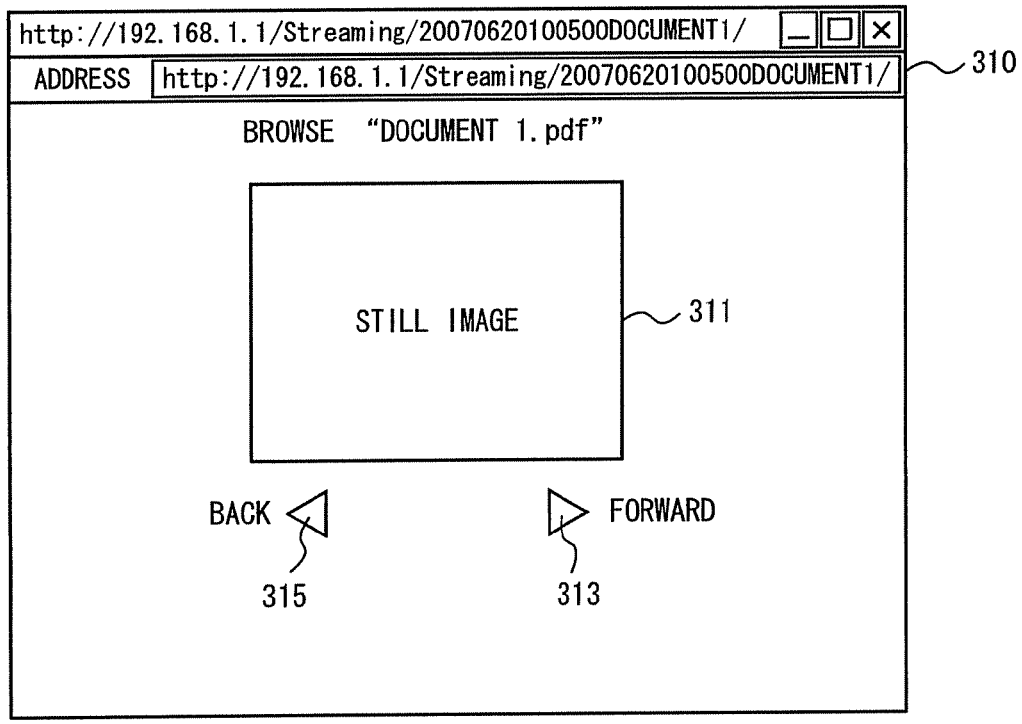
FIG. 6 is a diagram showing an example of a screen of a still image Web page.

FIG. 6 is a diagram showing an example of a screen of the still image Web page. Referring to FIG. 6, a screen 310 of the still image Web page displayed on PC 200 includes an area 311 for displaying still image, a page forwarding button 313, and a page reversing button 315. Area 311 for displaying still image displays a still image generated when CPU 201 executes a program to display still image.

Figure 7:
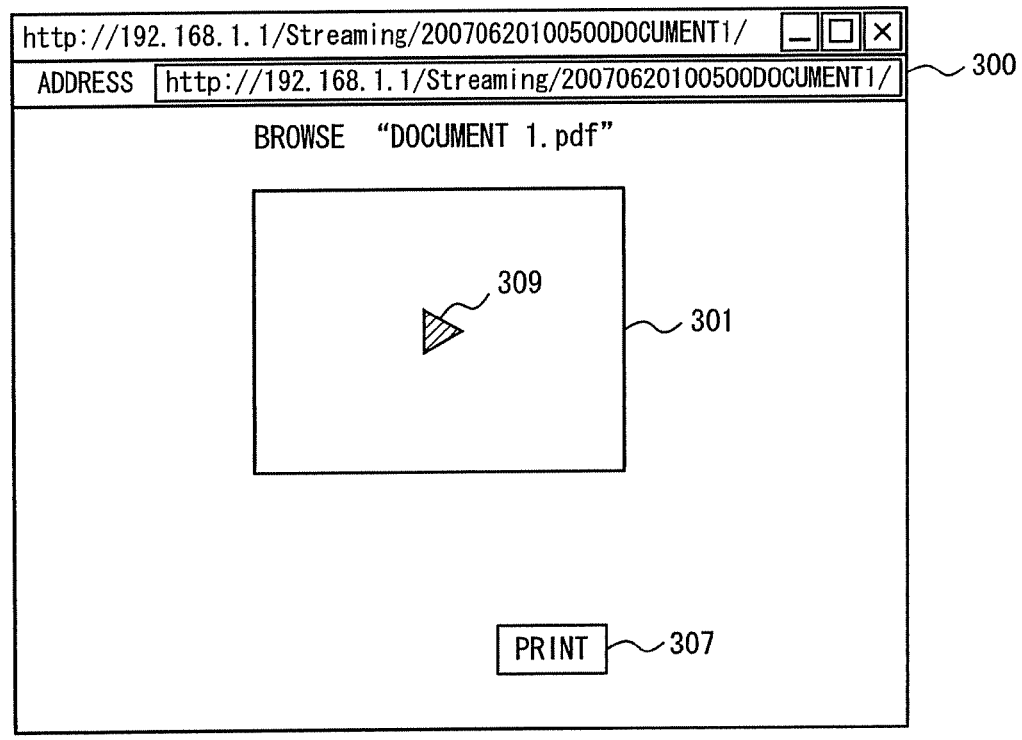
FIG. 7 is a diagram showing an example of a screen of a moving image Web page.

FIG. 7 is a diagram showing an example of a screen of the moving image Web page. Referring to FIG. 7, a screen 300 of the moving image Web page displayed on PC 200 includes an area 301 for displaying moving image. Area 301 for displaying moving image displays a moving image generated when CPU 201 executes an application program to display moving image.

Area 301 is linked to the URL of the meta file contained in the Web page. When an instruction is made through operation portion 207 for a reproduction button 309 contained in area 301, a signal that contains the URL of the meta file and demands transmission of the meta file is transmitted to MFP 100 through network I/F 204. The signal demanding meta file transmission is a part of a signal that demands real time streaming transmission.

While in this example description has been made of what is called an embedded type Web page, where screen 300 of the Web page displayed by the browser program contains area 301 for displaying a screen that displays moving images reproduced by the moving image reproducing program, it is also possible to use what is called a pop-up type Web page, where the moving image reproducing program displays an additional screen separate from the screen on which the browser program displays the Web page so that the additional screen displays moving images.

Referring back to FIG. 5, at MFP 100, when communication I/F portion 112 receives from PC 200 a signal that demands meta file transmission, moving image reproduction demand accepting portion 63 accepts the signal demanding meta file transmission from communication I/F portion 112 and the IP address of PC 200, which has transmitted the signal. Moving image reproduction demand accepting portion 63 reads from HDD 116 a meta file specified by the URL contained in the signal demanding meta file transmission on condition that a session is established to PC 200, and transmits the meta file to PC 200 based on the IP address accepted from communication I/F portion 112.

PC 200 that receives the meta file executes the moving image reproducing program and transmits a moving image reproduction demanding signal to MFP 100 through network I/F 204. The moving image reproduction demanding signal is a part of a signal that demands real time streaming transmission, and contains a command contained in the meta file.

At MFP 100, communication I/F portion 112 receives the moving image reproduction demanding signal transmitted from PC 200. MFP 100 serves as a moving image transmitting server. When communication I/F portion 112 receives the moving image reproduction demanding signal, moving image reproduction demand accepting portion 63 accepts the moving image reproduction demanding signal from communication I/F portion 112 and the IP address of PC 200, which has transmitted the moving image reproduction demanding signal. The moving image reproduction demanding signal is a command to transmit a moving image in a real time manner and contains a URL of a moving image file. Moving image reproduction demand accepting portion 63 outputs the URL of the moving image file to moving image generating portion 65 on condition that a session is established to PC 200 while at the same time outputting the URL of the moving image file and the IP address to transmitting portion 67.

Moving image generating portion 65 generates a moving image that displays a still image input from decoding portion 58 for a predetermined period of time. When selected still image data contains a plurality of still images, moving image generating portion 65 generates moving images that sequentially display the plurality of still images. Moving image generating portion 65 stores the generated moving image in a portion of HDD 116 specified by the URL of the moving image input from moving image reproduction demand accepting portion 63.

In this embodiment, since the encoded data is encoded according to an encoding system that enables decoding on a still image basis, decoding portion 58 decodes encoded data 92 and sequentially outputs decoded still images. Since moving image generating portion 65 generates a moving image upon output of a still image from decoding portion 58, not all pieces of encoded data 92 needs to be decoded in generating a moving image; only part of encoded data 92 needs to be decoded. This shortens the time before output of the moving image.

The resolution of the moving image generated by moving image generating portion 65 is preferably lower than that of the still image. The quantity of transmitted data is reduced in order to reduce communication load while at the same time making the quality of the moving image inferior to that of the still image. This makes it possible to, when the frame of the moving image is subjected to hard printing, make the quality of the printed image inferior to that of the still image and differentiate the printed image from the still image.

Transmitting portion 67 reads the moving image stored in the portion of HDD 116 specified by the URL of the moving image file input from moving image reproduction demand accepting portion 63, and outputs the moving image to PC 200 based on the IP address. PC 200 is executing the moving image reproducing program, and thus when network I/F 204 receives the moving image transmitted from MFP 100, PC 200 displays the received moving image on display portion 206. This enables the user of PC 200 to visually recognize the still image stored in MFP 100 in the form of moving image. Since the moving image is transmitted instead of the still image, a copy of the still image is prevented from being stored in HDD 116 of PC 200. The moving image is transmitted in a real time manner so that it is not stored in HDD 205 of PC 200. This prevents a copy of the still image from being generated based on the moving image. The resolution of the moving image is lower than that of the still image, and thus even when the frame of the moving image is subjected to hard printing, the printed image is poorer than the still image. This prevents a copy of the still image from being stored in HDD 116.

Upon completion of transmission of the moving image, transmitting portion 67 deletes the moving image stored in HDD 116. Thus, even when PC 200 directly makes an instruction for the meta file, the moving image file specified by the URL contained in the meta file does not exist in HDD 116, and therefore the moving image is not transmitted. While in this embodiment the moving image generated by moving image generating portion 65 is stored in HDD 116, the moving image generated by moving image generating portion 65 may be directly output to transmitting portion 67 instead of being stored in HDD 116. In this case, there is no need for deleting the moving image after transmission, since the moving image is not stored in HDD 116.

Printing instruction accepting portion 69 accepts a printing instruction that the user inputs to operation portion 160B. The printing instruction is input by an operation to designate encoded data 92 and an operation to designate printing conditions. Upon accepting the printing instruction, printing instruction accepting portion 69 outputs to decoding portion 58 a decoding instruction to decode encoded data 92 designated by the operation of the printing instruction while at the same time outputting an image formation instruction to image formation control portion 71. Upon accepting input of the image formation instruction, image formation control portion 71 causes image forming portion 140 to form the still image input from decoding portion 58 onto a sheet based on printing conditions contained in the image formation instruction.

Display instruction accepting portion 73 accepts input of a display instruction that the user inputs to operation portion 160B. The display instruction is input by an operation to designate encoded data 92. Upon accepting the display instruction, display instruction accepting portion 73 outputs to decoding portion 58 a decoding instruction to decode encoded data 92 designated by the operation of the display instruction while at the same time outputting a display instruction to image display control portion 75. Upon accepting input of the display instruction, image display control portion 75 causes display portion 160A to display the still image output from decoding portion 58.

While as the content generated by content generating portion 53 such a content is exemplified that contains a Web page and a meta file, it is also possible to generate a Web page that contains a command to transmit a moving image in a real time manner. In this case, the command to transmit a moving image in a real time manner is described in, for example, JAVA (registered trademark) script.

Figure 8:
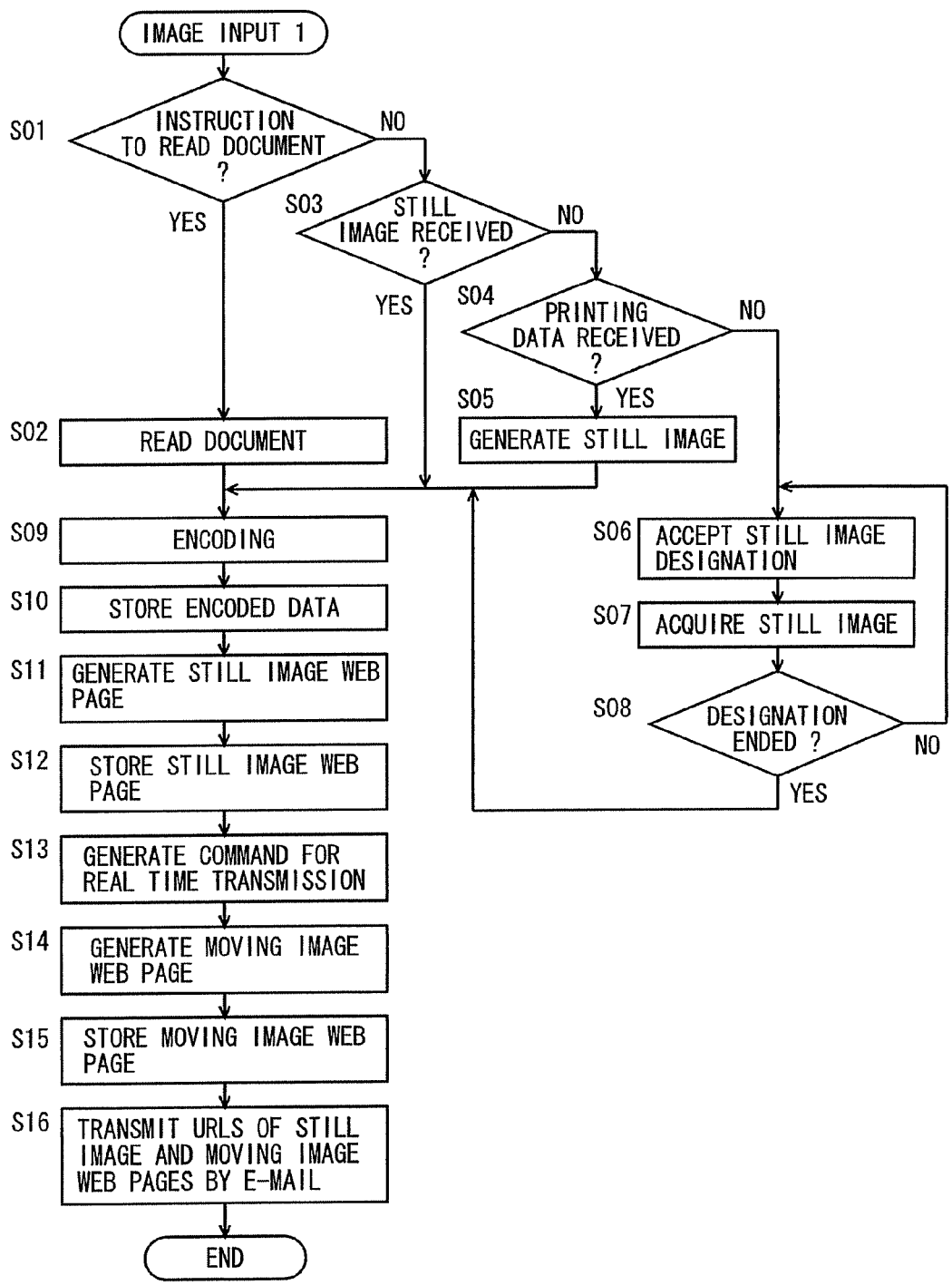
FIG. 8 is a flowchart showing an example of the flow of image inputting processing.

FIG. 8 is a flowchart showing an example of the flow of image inputting processing. The image inputting processing is executed by CPU 111 of MFP 100 when CPU 111 executes an image inputting program. Referring to FIG. 8, CPU 111 judges whether a document reading instruction is accepted (step S01). When the user inputs to operation portion 160B a document reading instruction to read a document image, CPU 111 accepts input of the document reading instruction from operation portion 160B. The document reading instruction is accepted by, for example, pressing a scan button and then a start button provided on operation portion 160B. When the document reading instruction is input, CPU 111 proceeds the processing to step S02, while otherwise proceeding the processing to step S03.

In step S02, CPU 111 causes document reading portion 130 to read the document image, acquires from document reading portion 130 a still image read from the document image and output from document reading portion 130, and proceeds the processing to step S09. In step S03, CPU 111 judges whether communication I/F portion 112 receives a still image from a PC connected to network 2. When the still image is received, CPU 111 proceeds the processing to step S09, while otherwise proceeding the processing to step S04. In step S04, CPU 111 judges whether communication I/F portion 112 receives printing data from the PC. When the printing data is received, CPU 111 proceeds the processing to step S05, while otherwise proceeding the processing to step S06. In step S05, CPU 111 generates a still image from the printing data and proceeds the processing to step S09.

In step S06, CPU 111 displays a file name of still image data stored in HDD 116 and accepts a designation of any of file names displayed on operation portion 160B from the user. Then CPU 111 acquires a still image with the designated file name (step S07) and judges whether the designation ends (step S08). When the designation ends, CPU 111 proceeds the processing to step S09, while otherwise returning the processing to step S06. The ending of the designation is accepted when the user inputs to operation portion 160B an operation to instruct to end the designation. Thus, at least one still image is acquired.

In step S09, CPU 111 encodes the still image acquired in step S02, the still image received in step S03, the still image generated in step S05, or the still image acquired in step S07 using an encoding key stored in advance in order to generate encoded data. Then CPU 111 stores the generated encoded data in HDD 116 (step S10).

Then CPU 111 generates a still image Web page (step S11) and stores the still image Web page in HDD 116 (step S12). At this time of the processing, the still image is not encoded and does not exist, and thus the still image Web page contains an area for a link to a still image that is intended to be encoded later.

In the next step S13, CPU 111 generates a command to transmit a moving image in a real time manner. Specifically, CPU 111 generates a meta file, stores the meta file in HDD 116, and generates a command that contains a URL of the meta file. The meta file is described in a markup language and contains a command to transmit a moving image in a real time manner. The command described in the meta file contains a URL of a moving image file described later and is a command for communication by a communication protocol for real time transmission, such as TRSP (Real Time Streaming Protocol) and MMS (Microsoft Media Server).

Then CPU 111 generates a moving image Web page (step S14) and stores the moving image Web page in HDD 116 (step S15). The moving image Web page contains the command for real time transmission generated in step S13. In the next step S16, CPU 111 generates and transmits an electronic mail that contains the URLs of the stored still image Web page and moving image Web page and that sets the transmission destination at a predetermined electronic mail address.

When the user causes PC 200 to receive the electronic mail, display portion 206 displays the URLs of the still image Web page and moving image Web page. When the user makes an instruction for the URL of the still image Web page, PC 200 executes a browser program to cause the still image Web page to be displayed on display portion 206. In this example, screen 300 shown in FIG. 6 is displayed on display portion 206 of PC 200. When the user makes an instruction for the URL of the moving image Web page, PC 200 executes a browser program to cause the moving image Web page to be displayed on display portion 206. In this example, the Web page shown in FIG. 7 is displayed on display portion 206 of PC 200. When the user makes an instruction, through operation portion 207, for reproduction button 309 contained in area 301 contained in moving image Web page 310, a signal that contains a URL of the meta file and demands transmission thereof is transmitted to MFP 100 through network I/F 204.

Figure 9:
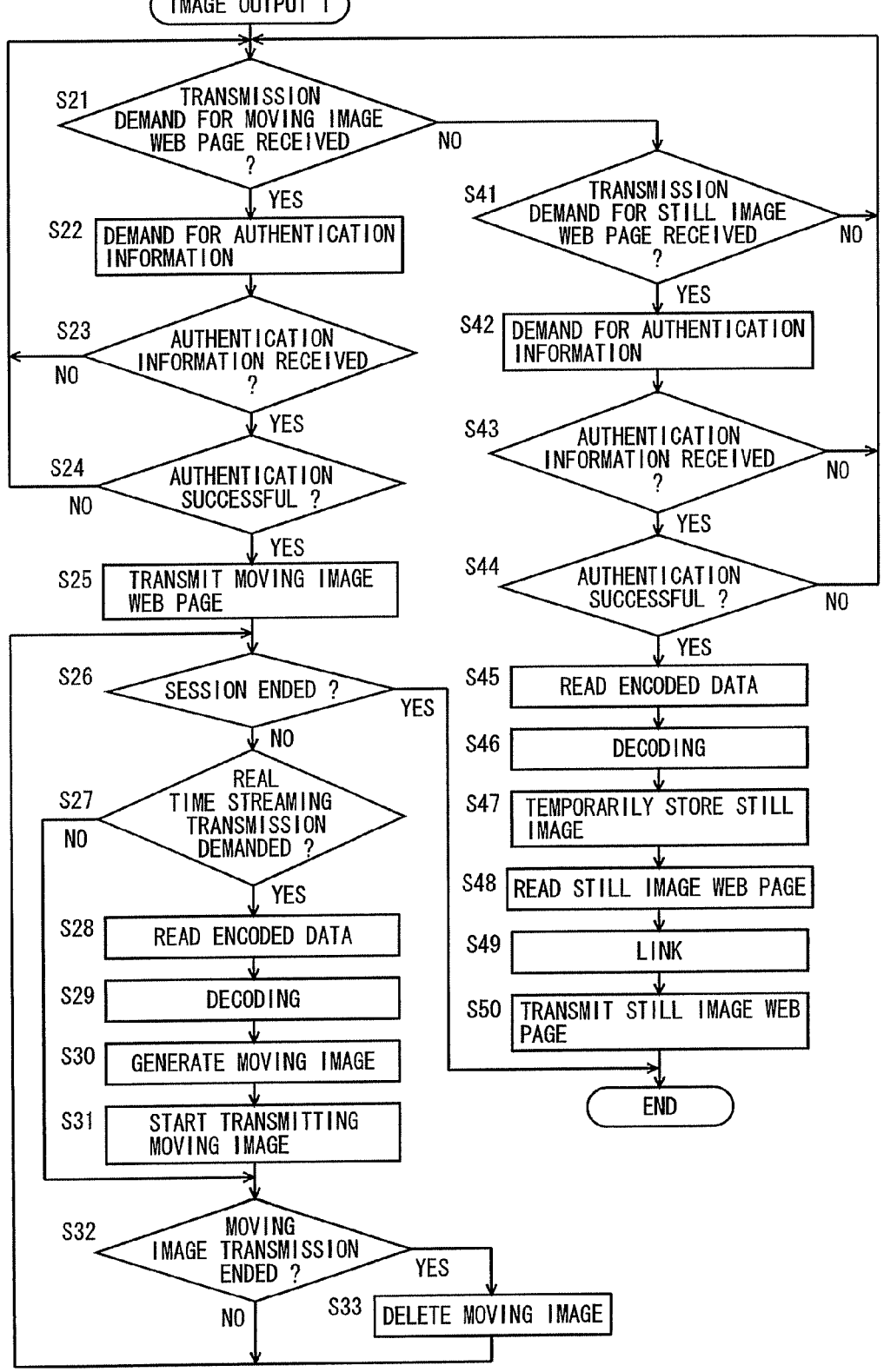
FIG. 9 is a flowchart showing an example of the flow of image outputting processing.

FIG. 9 is a flowchart showing an example of the flow of image outputting processing. The image outputting processing is executed by CPU 111 of MFP 100 when CPU 111 executes an image outputting program. Referring to FIG. 9, CPU 111 judges whether a transmission demand for transmission of a moving image Web page is received (step S21). When the transmission demand for transmission of a moving image Web page is received, CPU 111 proceeds the processing to step S22, while otherwise proceeding the processing to step S41. In step S41, CPU 111 judges whether a transmission demand for transmission of a still image Web page is received. When the transmission demand for transmission of a still image Web page is received, CPU 111 proceeds the processing to step S42, while otherwise returning the processing to step S21. In this example, description will be made of the case where a transmission demand for transmission of a moving image Web page or a transmission demand for transmission of a still image Web page is received from PC 200.

In step S22, CPU 111 makes a demand for authentication information. Specifically, CPU 111 transmits an authentication Web page to demand log-in to PC 200, which has transmitted the transmission instruction received in step S21, based on the IP address allotted to PC 200. The authentication Web page has an area to input a password serving as authentication information and contains a command to transmit the password input in the area to MFP 100. When the user of PC 200 inputs the password to operation portion 207 of PC 200, then PC 200 transmits the password to MFP 100 through network I/F 204.

In step S23, CPU 111 judges whether the password serving as authentication information is received. When the password is received, CPU 111 proceeds the processing to step S24, while otherwise returning the processing to step S21. This is for the purpose of handling the case of not receiving the password in the same manner as the case of failed authentication.

In step S24, CPU 111 judges whether an authentication based on the authentication information is successful. When the authentication is successful, CPU 111 proceeds the processing to step S25, while otherwise returning the processing to step S21. When the password received from PC 200 in step S23 agrees to a predetermined password, CPU 111 judges this case as a successful authentication, while when they do not agree, CPU 111 judges this case as a failed authentication. The predetermined password may be stored in HDD 116 while being associated with the user, or stored in HDD 116 while being associated with the Web page. Storing the password while associating it with the user who is able to log in MFP 100 enables the user to download the Web page. Storing the password while associating it with the Web page enables the user who has input the still image to MFP 100 or who has received the electronic mail to download the Web page.

In step S25, CPU 111 reads from HDD 116 a moving image Web page specified by the URL contained in the transmission demand received in step S21 and transmits the moving image Web page to PC 200, which has transmitted the transmission demand. Next, CPU 111 judges whether the session to PC 200, which has transmitted the transmission demand received in step S21, is ended (step S27). When the session is ended, CPU 111 ends the processing, while when the session is not ended, CPU 111 repeats the processing from steps S27 to S33.

In step S27, CPU 111 judges whether a real time streaming transmission demand is made. When the real time streaming transmission demand is made, CPU 111 proceeds the processing to step S28, while otherwise proceeding the processing to step S32. The judgment for the real time streaming transmission demand is made on condition that a session is established. The judgment for the real time streaming transmission demand is made by judging whether a signal for demanding meta file transmission and a moving image reproduction demanding signal are received. First, upon receipt of the signal for demanding meta file transmission, CPU 111 reads from HDD 116 a meta file specified by the URL contained in the signal for demanding meta file transmission and transmits the meta file to PC 200. PC 200 that receives the meta file transmits the moving image reproduction demanding signal to MFP 100 through network I/F 204, and thus CPU 111 receives the moving image reproduction demanding signal transmitted by PC 200.

In step S28, CPU 111 reads from HDD 116 encoded data 92 that is stored in HDD 116 and associated with the moving image Web page. Then CPU 111 decodes encoded data 92 and generates a moving image. Then CPU 111 generates a moving image based on the decoded still image (step S30). Specifically, CPU 111 generates a moving image that displays the still image for a predetermined period of time. When a plurality of still images are decoded, CPU 111 generates a moving image in what is called a "slide show" form, where the plurality of still images are sequentially displayed for a predetermined period of time.

Then CPU 111 starts transmitting the generated moving image to PC 200, which has transmitted the moving image reproduction demand (step S31). In step S32, CPU 111 judges whether moving image transmission is ended. When all of the moving image is transmitted, CPU 111 proceeds the processing to step S33, while otherwise returning the processing to step S26. In step S33, CPU 111 deletes the moving image generated in step S30 from HDD 116 and returns the processing to step S26. Thus, even when PC 200 directly makes an instruction for the meta file, the moving image file specified by the URL contained in the meta file does not exist in HDD 116, and therefore the moving image is not transmitted.

When judging that the transmission demand for the still image Web page is received in step S41, CPU 111 makes a demand for authentication information in step S42 similarly to step S22. Steps S42 to S44 of the processing are respectively the same as steps S22 to 24 described above, and therefore description thereof will not be repeated.

When judging that the authentication based on the authentication information is successful in step S44, CPU 111 reads from HDD 116 encoded data 92 that is stored in HDD 116 and associated with the still image Web page specified by the URL contained in the transmission demand received in step S41 (step S45). Then CPU 111 decodes encoded data 92 (step S46) and temporarily stores the still image (step S47). Next, CPU 111 reads from HDD 116 a still image Web page specified by the URL contained in the transmission demand received in step S41 (step S48). Then CPU 111 links the still image Web page to the still image temporarily stored in step S47 (step S49). The linked still image is set at modes that prohibit copying, storage, and printing and has a password set to keep the modes unchanged. The still image Web page is set at a mode that prohibits acceptance of external operations. For example, the command "< body oncontextmenu='return false' >" is added to the header.

Then CPU 111 transmits the still image Web page and the still image to PC 200, which has transmitted the transmission demand (step S32). Since the still image Web page is set at a mode that prohibits acceptance of external operations, PC 200 is prohibited from carrying out operations including storing the still image. Further, there is an application program executed at PC 200 to display the still image, but the program cannot copy, store, and print the still image since the still image is set at modes that prohibit copying, storage, and printing. In addition, the modes are protected with a password, which prevents the modes from being released.

Figure 10:
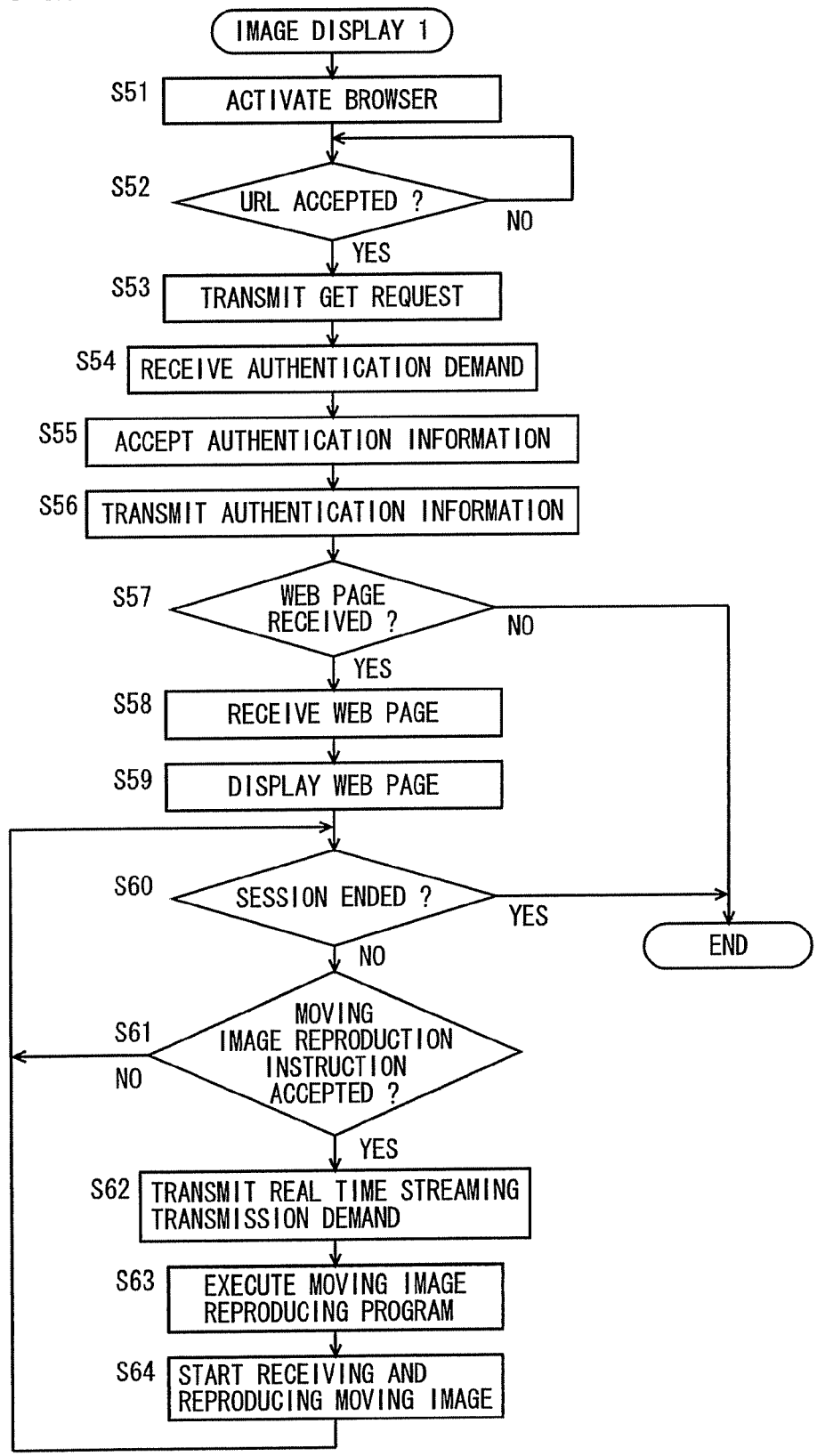
FIG. 10 is a flowchart showing an example of the flow of image displaying processing.

FIG. 10 is a flowchart showing an example of the flow of image displaying processing. The image displaying processing is executed by CPU 201 of PC 200 when CPU 201 executes a browser program or a moving image reproducing program.

Referring to FIG. 10, CPU 201 executes a browser program (step S51). Then CPU 201 judges whether a URL is accepted. CPU 201 turns into a stand-by state until acceptance of the URL. Upon acceptance of the URL, CPU 201 proceeds the processing to step S53. Either a URL of the moving image or a URL of the still image contained in the electronic mail transmitted from MFP 100 is accepted. It is also possible that the user who has caused PC 200 to receive the electronic mail transmitted from MFP 100 makes an instruction for a URL contained in an electronic mail displayed on display portion 206, thereby causing PC 200 to accept operations to instruct activation of the browser program and to instruct for the URL.

In step S53, CPU 201 transmits a GET request that contains the URL accepted in step S52. In this example, the URL contains an IP address allotted to MFP 100, which has transmitted the electronic mail, and therefore the GET request is transmitted to MFP 100.

Then CPU 201 receives an authentication demand (step S54). In this example, an authentication Web page is transmitted from MFP 100, and therefore CPU 201 receives the authentication Web page and displays it on display portion 206, and accepts authentication information that the user inputs on operation portion 207 (step S55). Then CPU 201 transmits the accepted authentication information to MFP 100 (step S56).

In step S57, CPU 201 judges whether a Web page is received. When the Web page is received, CPU 201 proceeds the processing to step S58, while otherwise ending the processing. When an authentication based on the authentication information transmitted in step S56 fails at MFP 100, nothing is transmitted therefrom, in which case the processing ends.

In step S58, CPU 201 receives the Web page transmitted from MFP 100. Then CPU 201 displays the received Web page on display portion 206. When the URL of the still image Web page is accepted in step S51, the screen of the still image Web page shown in FIG. 6 is displayed, while when the URL of the moving image Web page is accepted in step S51, the screen of the moving image Web page shown in FIG. 7 is displayed. In step S60, CPU 201 judges whether a session is ended. When the session is ended, CPU 201 ends the processing, while otherwise proceeding the processing to step S61. For example, CPU 201 judges that the session is ended when the user inputs an instruction to end the browser program activated in step S51. Also CPU 201 judges that the session is ended when receiving a signal for ending the session from MFP 100.

The processing of step S61 and thereafter is executed when the URL of the moving image Web page is accepted in step S51. In step S61, CPU 201 judges whether a moving image reproducing instruction is accepted. CPU 201 accepts the moving image reproducing instruction when an instruction is made in step S59 from operation portion 207 to reproduction button 309 contained in area 301 that is contained in screen 300 of the moving image Web page displayed on display portion 206. When the moving image reproducing instruction is accepted, CPU 201 proceeds the processing to step S62, while otherwise returning the processing to step S60. In step S62, CPU 201 transmits a real time streaming transmission demand to MFP 100. First, CPU 201 transmits to MFP 100 through network I/F 204 a signal for demanding transmission of a meta file linked to area 301 of the Web page. In response, CPU 201 receives the meta file from MFP 100 and transmits a moving image reproduction demanding signal contained in the meta file to MFP 100 through network I/F 204.

Then CPU 201 executes a moving image reproducing program (step S63); receives the moving image transmitted from MFP 100 and starts processing for reproduction (step S64); and returns the processing to step S60. Thus, the moving image is reproduced until the session ends. When a moving image reproducing instruction is accepted again in step S61 after reproduction of the moving image ends, then reproduction of the moving image restarts.

<Modified Embodiment>

While MFP 100 in the above embodiment stores encoded data 92 in HDD 116, MFP 100 in this modified embodiment externally outputs the encoded data. Description will be made mainly of the respects in which this MFP 100 differs from MFP 100 in the above embodiment.

Figure 11:
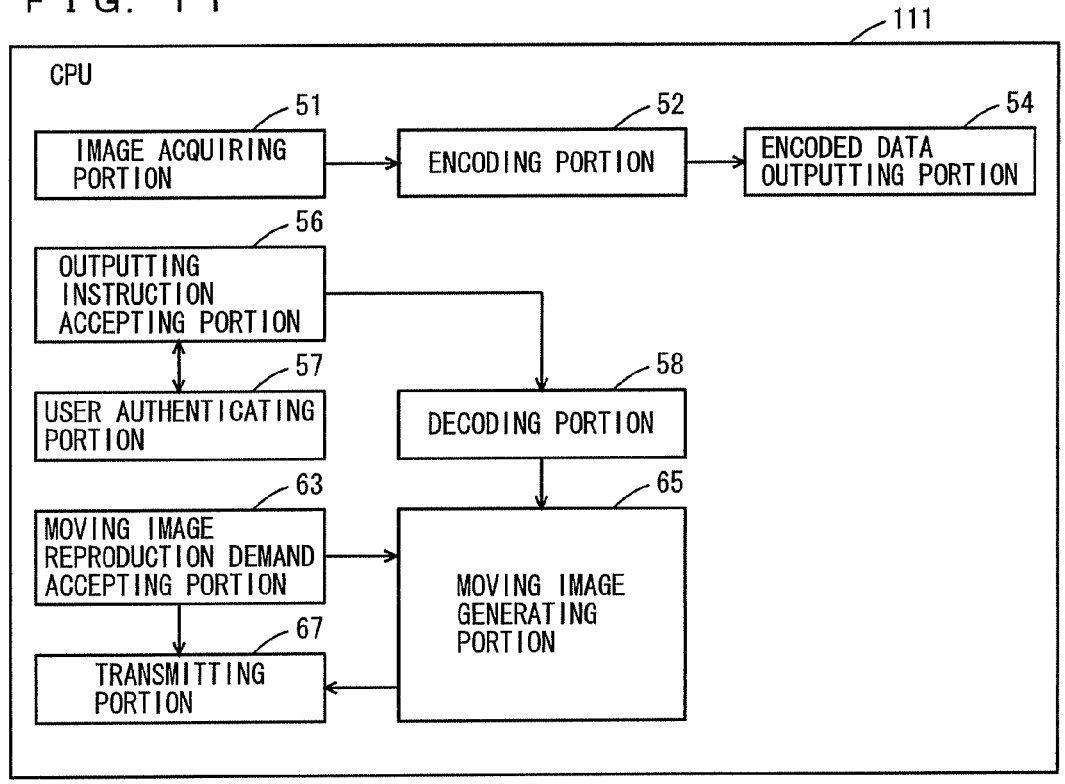
FIG. 11 is a functional block diagram showing an example of the functions of the CPU of an MFP according to a modified embodiment.

FIG. 11 is a functional block diagram showing an example of the functions of the CPU of the MFP according to the modified embodiment. Referring to FIG. 11, CPU 111 of MFP 100 according to the modified embodiment includes an image acquiring portion 51 to acquire a still image, an encoding portion 52 to generate encoded data by encoding the still image, an encoded data outputting portion 54 to externally transmit the encoded data, an outputting instruction accepting portion 56 to accept an outputting instruction of the still image, a user authenticating portion 57 to authenticate a user, a decoding portion 58 to decode the encoded data, a moving image reproduction demand accepting portion 63 to accept a moving image reproduction demand, a moving image generating portion 65 to generate a moving image from the still image, and a transmitting portion 67 to transmit the moving image.

Image acquiring portion 51 acquires a still image and outputs the acquired still image to encoding portion 52. Encoding portion 52 encodes the still image input from image acquiring portion 51 using an encoding key stored in advance. The encoding key may be a key stored only in MFP 100; for example, MFP 100 may automatically issue the key. Encoding portion 52 carries out encoding according to an encoding system that enables decoding on a still image basis. For example, a stream encoding system may be used. Encoding portion 52 then outputs encoded data resulting from encoding the still image to encoded data outputting portion 54. In this case, encoded data 92 may be stored in HDD 116.

Encoded data outputting portion 54 externally outputs the encoded data. The output destination is determined by an instruction input by the user. For example, encoded data outputting portion 54 stores the encoded data in flash memory 118A mounted to card I/F 118. The encoded data may be transmitted to other MFPs 101 and 102 or PC 200, which are connected to network 2, through communication I/F portion 112. It is also possible to generate an electronic mail attached with the encoded data and transmit it to an electronic mail server. Even though the encoded data is output externally, the decoding key for decoding the encoded data is possessed by MFP 100, and therefore the encoded data cannot be decoded outside. This prevents leakage of confidential information.

Outputting instruction accepting portion 56, upon accepting an outputting demand from outside, transmits an outputting instruction Web page. MFP 100 stores the outputting instruction Web page in HDD 116 in advance. When the user operates PC 200 to execute a browsing program and inputs a URL of the outputting instruction Web page, then PC 200 outputs to MFP 100 a transmission demand for transmission of the outputting instruction Web page. In this example, the transmission demand is a GET command and contains the URL of the outputting instruction Web page. When communication I/F portion 112 receives the transmission demand for the outputting instruction Web page from PC 200, outputting instruction accepting portion 56 accepts the transmission demand and an IP (Internet Protocol) address of PC 200, which has transmitted the transmission demand. Outputting instruction accepting portion 56 first outputs the IP address of PC 200 to user authenticating portion 57. Then, on condition that an authentication by user authenticating portion 57 is successful, outputting instruction accepting portion 56 reads the outputting instruction Web page from HDD 116 and transmits the outputting instruction Web page to PC 200 based on the IP address through communication I/F portion 112.

Figure 12:
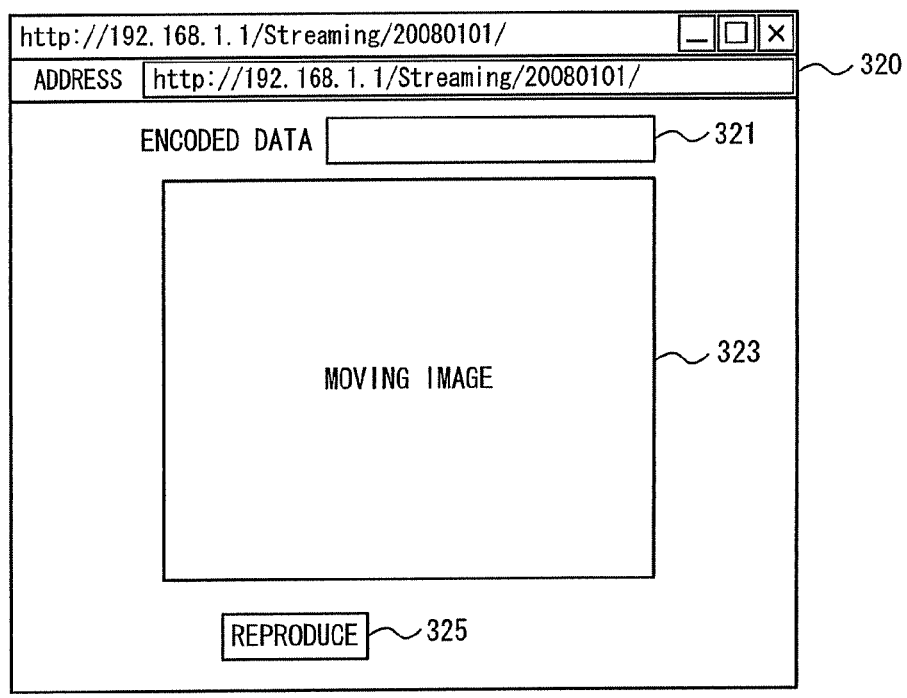
FIG. 12 is a diagram showing an example of a screen of an output instructing Web page.

FIG. 12 is a diagram showing an example of a screen of the output instructing Web page. Referring to FIG. 12, a screen 320 of the output instructing Web page includes an area 321 to which a file name of encoded data 92 is input, an area 323 to display a moving image, and a button 325 provided with the indication "Reproduce." When the user of PC 200 inputs the file name of encoded data 92 to area 321, PC 200 transmits the file name to MFP 100. Button 325 is linked to the URL of the meta file contained in the output instructing Web page. When operation portion 207 makes an instruction for button 325, a signal that contains the URL of the meta file and demands transmission of the meta file is transmitted to MFP 100 through network I/F 204. The signal demanding meta file transmission is a part of a signal that demands real time streaming transmission.

When communication I/F portion 112 receives the file name transmitted from PC 200, outputting instruction accepting portion 56 outputs a decoding instruction that contains the file name to decoding portion 58.

Upon accepting input of the decoding instruction from outputting instruction accepting portion 56, decoding portion 58 acquires and decodes encoded data specified by the file name contained in the decoding instruction. When the encoded data is stored in a recording medium of PC 200, decoding portion 58 acquires the encoded data from PC 200. When the encoded data is stored in HDD 116, decoding portion 58 reads the encoded data from HDD 116. Decoding portion 58 outputs the decoded still image to moving image generating portion 65.

While in this example description has been made of what is called an embedded type Web page, where screen 300 of the Web page displayed by the browser program contains area 301 for displaying a screen that displays moving images reproduced by the moving image reproducing program, it is also possible to use what is called a pop-up type Web page, where the moving image reproducing program displays an additional screen separate from the screen on which the browser program displays the Web page so that the additional screen displays moving images.

Moving image reproduction demand accepting portion 63, moving image generating portion 65, and transmitting portion 67 are the same as those in the above embodiment, and therefore description thereof will not be repeated.

Figure 13:
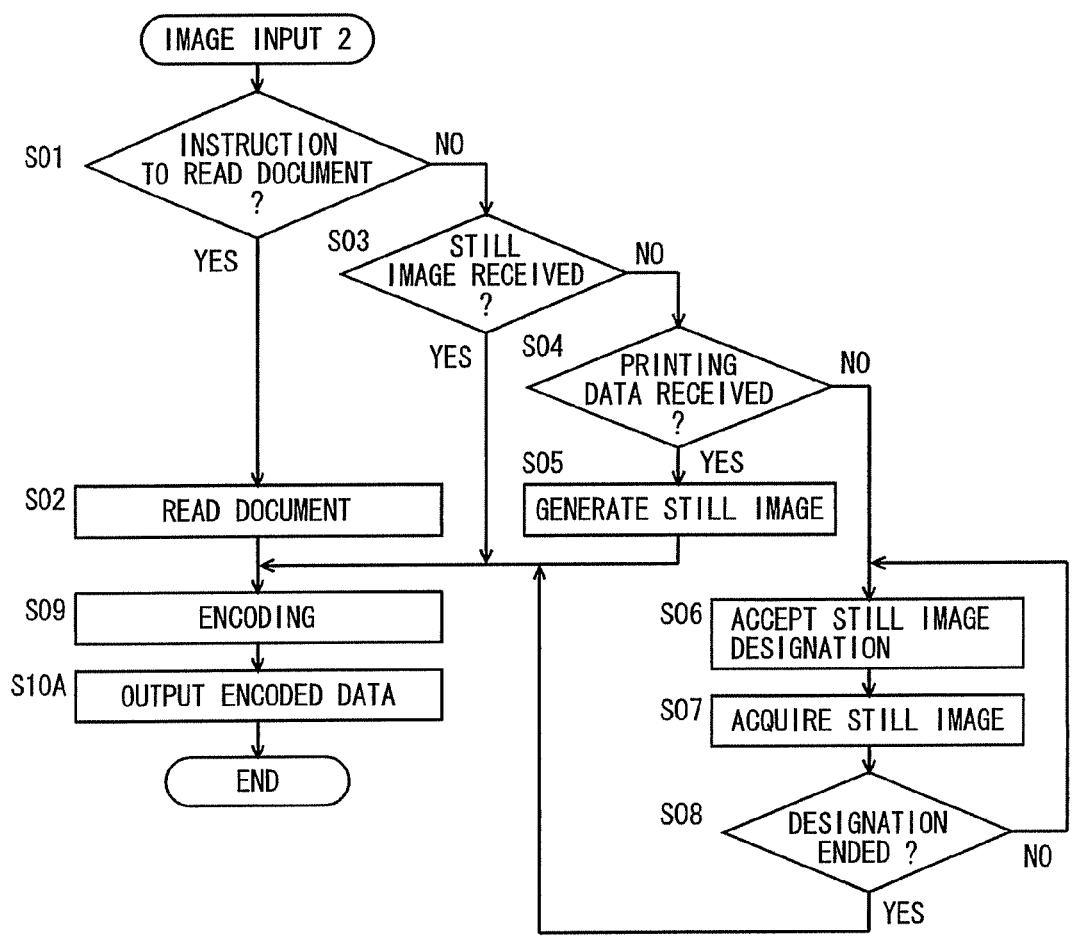
FIG. 13 is a flowchart showing an example of the flow of image inputting processing according to the modified embodiment.

FIG. 13 is a flowchart showing an example of the flow of image inputting processing according to the modified embodiment. The image inputting processing according to the modified embodiment is executed by CPU Ill of MFP 100 according to the modified embodiment when CPU 111 executes an image inputting program. Referring to FIG. 13, steps S01 to S09 of the processing are the same as those shown in FIG. 8. When a still image is encoded in step S09, CPU 111 externally outputs the encoded data in step S10. The output destination is determined by an instruction input by the user. Examples include storage in flash memory 118A mounted to card I/F 118, transmission to other MFPs 101 and 102 or PC 200, which are connected to network 2, through communication I/F portion 112, and transmission of an electronic mail attached with the encoded data. Even though the encoded data is output externally, the decoding key for decoding the encoded data is possessed by MFP 100, and therefore the encoded data cannot be decoded outside. This prevents leakage of confidential information.

Figure 14:
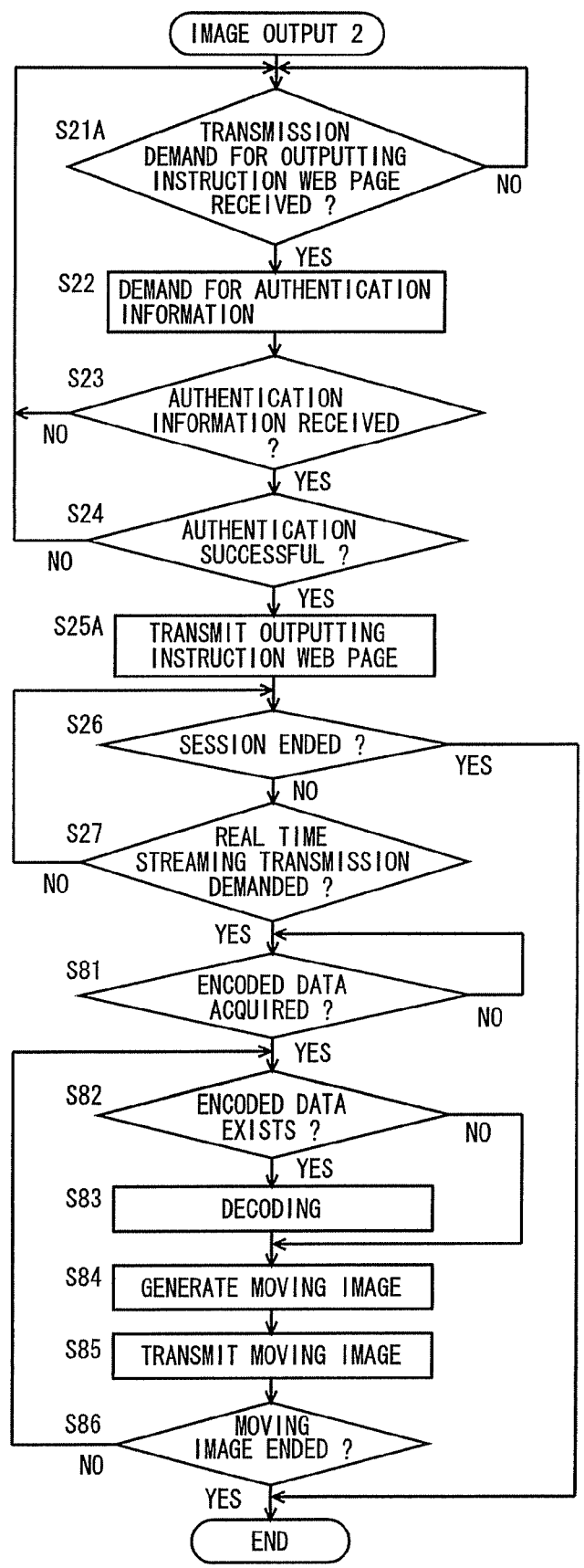
FIG. 14 is a flowchart showing an example of the flow of image outputting processing according to the modified embodiment.

FIG. 14 is a flowchart showing an example of the flow of image outputting processing according to the modified embodiment. The image outputting processing according to the modified embodiment is executed by CPU 111 of MFP 100 according to the modified embodiment when CPU 111 executes an image outputting program. Referring to FIG. 14, CPU 111 judges whether a transmission demand for an outputting instruction Web page is received (step S21A). CPU 111 turns into a stand-by state until receipt of the transmission demand for the outputting instruction Web page ("NO" in step S21A). Upon receipt of the transmission demand, CPU 111 proceeds the processing to step S22. Steps S22 to S24 of the processing are the same as those shown in FIG. 9, and therefore description thereof will not be repeated.

When an authentication is successful in step S24, CPU 111 reads from HDD 116 an outputting instruction Web page specified by the URL contained in the transmission demand received in step S21A, and transmits the outputting instruction Web page to PC 200, which has transmitted the transmission demand (step S25A). Next, CPU 111 judges whether the session established to PC 200, which has transmitted the transmission demand in step S21A, is ended (step S26). When the session is ended, CPU 111 ends the processing, while proceeding the processing to step S27 when the session is not ended.

In step S27, CPU 111 judges whether a real time streaming transmission demand is made. When the real time streaming transmission demand is made, CPU 111 proceeds the processing to step S81, while otherwise returning the processing to step S26.

In step S81, CPU 111 judges whether encoded data is acquired. CPU 111 judges that encoded data is acquired when receiving a file name from PC 200 and encoded data specified by the file name from PC 200. When, in step S81, the receipt of the encoded data starts before completion of receipt of all pieces of the encoded data, CPU 111 proceeds the processing to step S82.

In step S82, CPU 111 judges whether encoded data targeted for decoding exists. When there is encoded data yet to be decoded, CPU 111 proceeds the processing to step S83, while otherwise proceeding the processing to step S84. In step S83, CPU 111 decodes the encoded data acquired in step S81 and proceeds the processing to step S84. Step S81 is proceeded to step S82 even in the course of receiving the encoded data. Thus, the processing of receiving the encoded data (step S81) and the processing of decoding the encoded data (step S83) are carried out simultaneously.

In the next step S84, CPU 111 generates a moving image based on the decoded still image. Specifically, CPU 111 generates a moving image that displays the decoded still image for a predetermined period of time. Then CPU 111 transmits the generated moving image to PC 200, which has transmitted the real time streaming transmission demand (step S85). At this time of the processing, when the processing of receiving the encoded data that started in step S81 is not complete yet, then the processing of receiving the encoded data, the processing of decoding the encoded data, the processing of generating a moving image, and the processing of transmitting the moving image are carried out simultaneously.

In step S86, CPU 111 judges whether moving image transmission is ended. When all of the moving image is transmitted, CPU 111 ends the processing, while otherwise returning the processing to step S82.

FIG. 15 is a flowchart showing an example of the flow of image 5 displaying processing according to the modified embodiment. The image displaying processing according to the modified embodiment is executed by CPU 201 of PC 200 when CPU 201 executes a browser program or a moving image reproducing program. Referring to FIG. 15, the image displaying processing differs from the image displaying processing shown in FIG. 10 in that steps S60A and S61A are added. The other respects of the image displaying processing are the same as the image displaying processing, and description will be made of the different respects.

In step S52, CPU 201 accepts a URL. In this example, CPU 201 accepts a URL allotted to an outputting instruction Web page. Thus, in step S58, CPU 201 receives the outputting instruction Web page and displays it in step S59. When judging that the session to MFP 100 is not ended in step S60, CPU 201 accepts designation of encoded data in the next step S60A. In this example, the case of designating encoded data stored in HDD 205 of PC 200 will be described.

Then CPU 201 judges whether a moving image reproducing instruction is accepted (step S61). When an instruction is made for button 325 contained in the outputting instruction Web page, CPU 201 accepts the moving image reproducing instruction. Upon accepting the moving image reproducing instruction, CPU 201 starts the processing of transmitting the encoded data designated in step S60A to MFP 100 and proceeds the processing to step S62. Thus, the processing of transmitting the encoded data to MFP 100 and the processing of receiving and reproducing the moving image are carried out simultaneously.

As has been described hereinbefore, MFPs 100, 101, and 102, which serve as image processing apparatuses according to this embodiment, each encode a still image using an encoding key, decode the encoded data using the encoding key or a decoding key corresponding to the encoding key, and output the decoded still image in an electronically non-recordable form. Specifically, the MFPs each generate a moving image that displays the still image and carry out a real time streaming transmission of the generated moving image in response to a demand from PC 200, which is connected to the network. Since a moving image is transmitted instead of a still image, the still image is prevented from being output externally. The real time streaming transmission prevents accumulation of the moving image in PC 200, which in turn prevents generation of a copy of the moving image.

The MFPs start decoding of the encoded data before all pieces of the encoded data are input and sequentially output still images, and generate moving images based on the output still images. This enables the moving image to be transmitted before all pieces of the encoded data are decoded, thereby shortening the time before transmission of the moving images.

The MFPs each transmit a still image Web page that contains a link to a still image and prohibits access thereto by external operations. This enables the still image to be displayed on PC 200 and prevents the still image from being copied on PC 200.

In the case where MFP 100 transmits encoded data to PC 200 and the encoded data is stored therein, when PC 200 transmits the encoded data to MFP 100, then MFP 100 transmits a still image resulting from decoding the encoded data to PC 200 in an electronically non-recordable form. This enables the encoded data stored in PC 200 to be checked at PC 200.

PC 200 only needs to execute a browsing program; there is no need for developing or installing a new program.

While in the above embodiments description has been made of MFPs 100, 101, and 102 as the image processing apparatuses, it will be readily appreciated that the present invention can also be taken as an image outputting method for executing the processing shown in FIG. 8, FIG. 9, FIG. 13, or FIG. 14, or as an image outputting program for causing a computer to execute the image outputting method.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus configured for connection to a computer through a network comprising:
   an image acquiring component to acquire a plurality of still images;
   an encoding component to generate encoded data by encoding said acquired plurality of still images using an encoding key stored in advance;
   a decoding component to decode said encoded data using said encoding key or a decoding key corresponding to said encoding key;
   a moving image generating component, based on said decoded plurality of still images, to generate a moving image in a slide show form in which said plurality of still images are sequentially displayed;
   an outputting component, in response to a moving image reproduction demand from said computer, to transmit said generated moving image to said computer;
   a content generating component to generate a moving image Web page causing said computer to display said generated moving image;
   a location information transmitting component to transmit location information of said generated moving image Web page to said computer; and
   a content transmitting component, in a case where transmitted location information of said moving image Web page is instructed by a user, to transmit said moving image Web page to said computer, wherein:
   said moving image reproduction demand from said computer is carried out when in said moving image Web page it is instructed to reproduce a moving image; and
   said outputting component, in response to a moving image reproduction demand from said computer, transmits said moving image to said computer.

2. The image processing apparatus according to claim 1, further comprising:
   an encoded data outputting component to externally output said encoded data; and
   an encoded data input component to accept external input of said encoded data, wherein:
   said decoding component starts decoding pieces of encoded data before all said pieces of encoded data are input from said encoded data input component, and outputs still images in order of decoding;
   said moving image generating component generates moving images based on said still images sequentially output from said decoding component; and
   said outputting component carries out said real time streaming transmission of said generated moving image.

3. The image processing apparatus according to claim 1, further comprising an authenticating component to authenticate a user,
   wherein said decoding component decodes said encoded data on condition that said user is authenticated by said authenticating component.

4. The image processing apparatus according to claim 1, wherein
   said content generating component further generates a still image Web page causing said computer to display said plurality of still images,
   said local information transmitting component transmits to said computer local information of said still image Web page in accordance with local information of said moving image Web page, and
   said content transmitting component, in a case where transmitted location information of said still image Web page is instructed by a user, transmits said still image Web page to said computer so as to prohibit duplicating, storing, and printing of said plurality of still images displayed on said still image Web page.

5. The image processing apparatus according to claim 1, further comprising:
- a storing component to store said generated moving image; and
- a deleting component to delete said image moving image stored in said storing component, wherein
  - said deleting component, when transmission of said moving image by said transmitting component is ended, deletes said moving image from said storing component.

6. The image processing apparatus according to claim 1, wherein said acquiring component acquires said plurality of still images by reading a plurality of pages of documents.

7. An image outputting method executed by an image processing apparatus configured for connection to a computer through a network, comprising:
- acquiring a plurality of still images;
- generating encoded data by encoding said acquired plurality of still images using an encoding key stored in advance;
- decoding said encoded data using said encoding key or a decoding key stored in advance to correspond to said encoding key;
- based on said decoded plurality of still images, generating a moving image in a slide show form in which said plurality of still images are sequentially displayed;
- in response to a moving image reproduction demand from said computer, transmitting said generated moving image to said computer;
- generating a moving image Web page for causing said computer to display said generated moving image;
- transmitting location information of said generated moving image Web page to said computer; and
- in a case where transmitted location information of said moving image Web page is instructed by a user, transmitting said moving image Web page to said computer, wherein:
  - said moving image reproduction demand from said computer is carried out when in said moving image Web page it is instructed to reproduce a moving image; and
  - said step of transmitting said moving image, in response to a moving image reproduction demand from said computer, transmits said moving image to said computer.

8. The image outputting method according to claim 7, wherein
- the step of generating said moving image Web page uses a content generating component and further generates a still image Web page causing said computer to display said moving image,
- the step of transmitting location information of said moving image Web page uses a location information transmitting component and transmits to said computer location information of said still image Web page in accordance with location information of said moving image Web page, and
- the step of transmitting said moving image Web page uses a content transmitting component, in a case where transmitted location information of said still image Web page is instructed by a user, and transmits said still image Web page to said computer so as to prohibit duplicating, storing, and printing of said moving images displayed on said still image Web page.

9. A non-transitory computer readable recording medium encoded with an image outputting program causing a computer to execute processing comprising:
- acquiring a plurality of still images;
- generating encoded data by encoding said acquired plurality of still images using an encoding key stored in advance;
- decoding said encoded data using said encoding key stored in advance or a decoding key stored in advance to correspond to said encoding key;
- based on said decoded plurality of still images, generating a moving image in a slide show form in which said plurality of still images are sequentially displayed;
- in response to a moving image reproduction demand from said computer, transmitting said generated moving image to said computer;
- generating a moving image Web page for causing said computer to display said generated moving image;
- transmitting location information of said generated moving image Web page to said computer; and
- in a case where transmitted location information of said moving image Web page is instructed by a user, transmitting said moving image Web page to said computer, wherein:
  - said moving image reproduction demand from said computer is carried out when in said moving image Web page it is instructed to reproduce a moving image; and
  - said step of transmitting said moving image, in response to a moving image reproduction demand from said computer, transmits said moving image to said computer.

10. The non-transitory computer readable recording medium encoded with the image outputting program according to claim 9, wherein
- the step of generating said moving image Web page uses a content generating component and further generates a still image Web page causing said computer to display said moving image,
- the step of transmitting location information of said moving image Web page uses a location information transmitting component and transmits to said computer location information of said still image Web page in accordance with location information of said moving image Web page, and
- the step of transmitting said moving image Web page uses a content transmitting component, in a case where transmitted location information of said still image Web page is instructed by a user, and transmits said still image Web page to said computer so as to prohibit duplicating, storing, and printing of said moving images displayed on said still image Web page.

* * * * *